(12) United States Patent
Amosov et al.

(10) Patent No.: US 12,497,319 B2
(45) Date of Patent: Dec. 16, 2025

(54) APPARATUS AND METHODS FOR FABRICATING A GLASS RIBBON

(71) Applicant: CORNING INCORPORATED, Corning, NY (US)

(72) Inventors: Alexey Sergeyevich Amosov, Avon (FR); Olivier Fournel, Yerres (FR); Vladislav Yuryevich Golyatin, Avon (FR); Xavier Tellier, Cheroy (FR)

(73) Assignee: Corning Incorporated, Corning, NY (US)

( * ) Notice: Subject to any disclaimer, the term of this patent is extended or adjusted under 35 U.S.C. 154(b) by 1234 days.

(21) Appl. No.: 17/267,190

(22) PCT Filed: Aug. 6, 2019

(86) PCT No.: PCT/US2019/045278
§ 371 (c)(1),
(2) Date: Feb. 9, 2021

(87) PCT Pub. No.: WO2020/033387
PCT Pub. Date: Feb. 13, 2020

(65) Prior Publication Data
US 2021/0300808 A1 Sep. 30, 2021

Related U.S. Application Data

(60) Provisional application No. 62/717,173, filed on Aug. 10, 2018.

(51) Int. Cl.
*C03B 17/06* (2006.01)
(52) U.S. Cl.
CPC .................................. *C03B 17/064* (2013.01)
(58) Field of Classification Search
CPC ........... B29C 48/12; B05C 5/02; C03B 7/088; C03B 17/064
See application file for complete search history.

(56) References Cited

U.S. PATENT DOCUMENTS 1,829,639 A * 10/1931 Ferngren ............... C03B 17/064
65/195
2,422,466 A 6/1947 Brown
(Continued)

FOREIGN PATENT DOCUMENTS

CN 104384067 A * 3/2015 ............... B05C 5/02
CN 105330131 A 2/2016
(Continued)

OTHER PUBLICATIONS

Chinese Patent Application No. 201980062050.3, Office Action dated Aug. 2, 2022, 4 pages (English Translation only), Chinese Patent Office.
(Continued)

*Primary Examiner* — Alison L Hindenlang
*Assistant Examiner* — Steven S Lee
(74) *Attorney, Agent, or Firm* — Ryan T. Hardee; Kevin M. Able; F. Brock Riggs

(57) ABSTRACT

Apparatus can comprise a conduit with at least one slot of a plurality of slots comprising an intermediate length including a maximum width that is less than a maximum width of a first end portion and/or a maximum width of a second end portion of the slot. In some embodiments, methods produce a glass ribbon with an apparatus comprising at least one slot within a peripheral wall of a conduit. In some embodiments, methods are provided for determining a volumetric flow profile dQ(x)/dx of molten material flowing through a slot in a peripheral wall of a conduit. In some embodiments, methods and apparatus provide a slot extending through an outer peripheral surface of a peripheral wall of a conduit that can comprise a width profile d(x) along a length of the slot to achieve a predetermined volumetric flow profile dQ(x)/dx of molten material through the slot.

20 Claims, 12 Drawing Sheets

(56) References Cited

U.S. PATENT DOCUMENTS

| | | | | |
|---|---|---|---|---|
| 3,149,949 | A | * | 9/1964 | Dockerty .............. C03B 17/064 |
| | | | | 65/195 |
| 3,338,696 | A | | 8/1967 | Dockerty |
| 3,589,887 | A | * | 6/1971 | Ward .................... C03B 17/064 |
| | | | | 65/129 |
| 3,607,182 | A | * | 9/1971 | Leibowitz ............ C03B 17/064 |
| | | | | 65/195 |
| 4,268,296 | A | | 5/1981 | Pfaender |
| 5,567,493 | A | * | 10/1996 | Imai ....................... B29C 48/11 |
| | | | | 425/464 |
| 5,700,325 | A | | 12/1997 | Watanabe ............. B05C 5/0254 |
| | | | | 118/411 |
| 6,183,829 | B1 | * | 2/2001 | Daecher ............. B29C 48/9135 |
| | | | | 430/945 |
| 6,224,805 | B1 | | 5/2001 | Fields et al. |
| 6,537,376 | B1 | * | 3/2003 | Yasui .................... G11B 5/848 |
| | | | | 118/411 |
| 6,997,017 | B2 | * | 2/2006 | Pitbladdo .............. C03B 17/064 |
| | | | | 65/195 |
| 7,591,903 | B2 | * | 9/2009 | Maier .................... B05C 5/027 |
| | | | | 118/411 |
| 2001/0030250 | A1 | * | 10/2001 | Goenka .................. B05B 1/042 |
| | | | | 239/592 |
| 2001/0039814 | A1 | * | 11/2001 | Pitbladdo .............. C03B 17/064 |
| | | | | 65/195 |
| 2003/0131632 | A1 | * | 7/2003 | Konno .................. C03B 37/083 |
| | | | | 65/497 |
| 2005/0263250 | A1 | * | 12/2005 | Ono ................... H05K 13/0469 |
| | | | | 156/349 |
| 2019/0144324 | A1 | | 5/2019 | De et al. |

FOREIGN PATENT DOCUMENTS

| | | | |
|---|---|---|---|
| CN | 107683264 A | 2/2018 | |
| TW | 201710195 A | 3/2017 | |
| TW | 201741261 A | 12/2017 | |
| WO | WO-2016196534 A1 * | 12/2016 | ........... C03B 17/064 |
| WO | 2017/176883 A1 | 10/2017 | |
| WO | WO-2017184544 A1 * | 10/2017 | ............. C03B 13/04 |
| WO | 2017/192636 A1 | 11/2017 | |
| WO | WO-2017192634 A1 * | 11/2017 | ............. C03B 13/00 |
| WO | WO-2017221471 A1 * | 12/2017 | ........... C03B 37/083 |
| WO | WO-2018020743 A1 * | 2/2018 | ........... C03B 37/083 |
| WO | WO-2018123888 A1 * | 7/2018 | ........... C03B 37/083 |

OTHER PUBLICATIONS

International Search Report and Written Opinion of the International Searching Authority; PCT/US19/45278; Mailed Oct. 23, 2019; 11 Pages; European Patent Office.
Taiwanese Patent Application No. 108128197, Office Action dated Apr. 28, 2023, 3 pages (English Translation Only); Taiwanese Patent Office.
Chinese Patent Application No. 202310138132.X , Office Action dated Mar. 29, 2025, 4 pages (English Translation only), Chinese Patent Office.

* cited by examiner

APPARATUS AND METHODS FOR FABRICATING A GLASS RIBBON

CROSS-REFERENCE TO RELATED APPLICATION

This application is a national stage application under 35 U.S.C. § 371 of International Application No. PCT/US2019/045278, filed on Aug. 6, 2019, which claims the benefit of priority under 35 U.S.C. § 119 of U.S. Provisional Application Ser. No. 62/717,173 filed on Aug. 10, 2018, the content of which is relied upon and incorporated herein by reference in its entirety.

BACKGROUND

It is known to process molten material into a glass ribbon with a forming apparatus. Conventional forming apparatus are known to operate to down draw a quantity of molten material from the forming apparatus as the glass ribbon.

SUMMARY

The following presents a simplified summary of the disclosure to provide a basic understanding of some exemplary embodiments described in the detailed description.

The present disclosure relates generally to apparatus and methods for fabricating a glass ribbon and, more particularly, to a conduit comprising at least one slot for passing molten material through the slot and methods.

In accordance with some embodiments, an apparatus can comprise a conduit comprising a peripheral wall defining a region extending in a flow direction of the conduit. The apparatus can further comprise a first portion of the peripheral wall comprising a plurality of slots extending through the peripheral wall. Each slot of the plurality of slots can be in fluid communication with the region. At least one slot of the plurality of slots can comprise an intermediate length extending between a first end portion and a second end portion. A maximum width along the intermediate length can be less than a maximum width of the first end portion and/or a maximum width of the second end portion. The apparatus can further comprise a wedge positioned downstream from the plurality of slots. The wedge can comprise a first wedge surface and a second wedge surface converging to form a root.

In accordance with one embodiment, the slots can be aligned along a linear path.

In accordance with another embodiment, the linear path can be parallel to the flow direction of the conduit.

In accordance with another embodiment, the linear path, the flow direction and the root of the wedge can extend along a common plane.

In accordance with another embodiment, a width of the intermediate length of the at least one slot can continuously decrease in the flow direction of the conduit or opposite the flow direction of the conduit.

In accordance with another embodiment, a method of producing a glass ribbon with the apparatus can comprise flowing molten material within the region in the flow direction of the conduit. The method can further comprise flowing molten material through each slot of the plurality of slots. The method can further comprise merging the molten material flowing through each slot of the plurality of slots into a first stream of molten material flowing over the first wedge surface and a second stream of molten material flowing over the second wedge surface. The method can further comprise drawing the first stream of molten material and the second stream of molten material off the root into a fused sheet of molten material. The method can further include cooling the fused sheet of molten material into the glass ribbon.

In accordance with another embodiment, the method can further comprise separating the glass ribbon into a plurality of divided glass ribbons along a separation path aligned with a location laterally between a pair of adjacent end portions of a corresponding pair of adjacent slots of the plurality of slots.

In accordance with some embodiments, methods of producing a slot in a peripheral wall of a conduit can comprise determining a width profile d(x) of the slot to achieve a predetermined volumetric flow profile dQ(x)/dx of molten material through the slot as a function of $$\frac{d}{dx}\left(\frac{K(x)}{n}\frac{dQ(x)}{dx}\mu(x)\right) = \frac{8}{\pi R^4}\mu(x)Q(x)$$

where μ(x) represents a predetermined viscosity of a molten material, R represents an internal radius of the conduit, n represents a number of slots in parallel, and $$K(x) = \frac{12 \cdot h}{d(x)^3} + \frac{10}{d(x)^2}$$

where h represents a thickness of the peripheral wall of the conduit. The method can further comprise generating (e.g., machining) a slot based on the determined width profile d(x), wherein the slot extends through the peripheral wall of the conduit.

In accordance with another embodiment, the slot comprises a first outer end portion, a second outer end portion and an intermediate portion positioned between the first end portion and the second end portion, and wherein the predetermined volumetric flow profile dQ(x)/dx of molten material through the slot comprises a molten material flow rate at a location of the intermediate portion that can be greater than at a location of the first end portion and a location of the second end portion.

In accordance with another embodiment, a width along the intermediate portion can be greater than a width of the first outer end portion and a width of the second outer end portion.

In accordance with another embodiment, the first outer end portion and the second outer end portion of the slot are each tapered in opposite directions.

In accordance with some embodiments, methods of determining a volumetric flow profile dQ(x)/dx of molten material flowing through a slot in a peripheral wall of a conduit can comprise measuring the width profile d(x) of the slot. The method can further comprise determining a volumetric flow profile dQ(x)/dx of molten material through the slot as a function of:

$$\frac{d}{dx}\left(\frac{K(x)}{n}\frac{dQ(x)}{dx}\mu(x)\right) = \frac{8}{\pi R^4}\mu(x)Q(x)$$

where μ(x) is a predetermined viscosity of a molten material, R represents an internal radius of the conduit, n represents a number of slots in parallel, and $$K(x) = \frac{12 \cdot h}{d(x)^3} + \frac{10}{d(x)^2}$$

where h represents a thickness of the peripheral wall of the conduit.

In some embodiments, methods of producing a glass ribbon can comprise flowing molten material within a region defined by a peripheral wall of a conduit, wherein the conduit can comprise a slot extending through an outer surface of the peripheral wall, and the slot can further comprise a first outer end portion, a second outer end portion and an intermediate portion positioned between the first end portion and the second end portion. The method can further comprise flowing molten material through the slot in the peripheral wall. The volumetric flow profile of molten material through the slot can comprise a volumetric molten material flow rate at a location of the intermediate portion that can be greater than a volumetric molten material flow rate at a location of the first end portion and a location of the second end portion. The method can further comprise flowing a first stream of molten material from the slot over a first wedge surface of a wedge. The method can further comprise flowing a second stream of molten material from the slot over the second wedge surface of the wedge. The first stream of molten material and the second stream of molten material can converge in a direction toward a root. The method can further comprise drawing the first stream of molten material and the second stream of molten material off the root into a fused sheet of molten material. The method can further comprise cooling the fused sheet of molten material into the glass ribbon.

In one embodiment, the first outer end portion and the second outer end portion of the slot are each tapered in opposite directions.

In some embodiments, an apparatus can comprise a conduit comprising a peripheral wall defining a region extending in a flow direction of the conduit. The apparatus can comprise a first portion of the peripheral wall comprising a slot extending through the peripheral wall. The slot can be in fluid communication with the region. The slot can comprise a length extending between a first end of a first outer end portion of the slot and a second end of a second outer end portion of the slot. The slot can comprise a width profile d(x) of the slot along the length of the slot that is configured to achieve a predetermined volumetric flow profile dQ(x)/dx of molten material through the slot as a function of $$\frac{d}{dx}\left(\frac{K(x)}{n}\frac{dQ(x)}{dx}\mu(x)\right) = \frac{8}{\pi R^4}\mu(x)Q(x)$$

where μ(x) represents a predetermined viscosity of a molten material, R represents an internal radius of the conduit, n represents a number of slots in parallel, and $$K(x) = \frac{12 \cdot h}{d(x)^3} + \frac{10}{d(x)^2}$$

where h represents a thickness of the peripheral wall of the conduit.

The apparatus can further comprise a wedge positioned downstream from the slot. The wedge can comprise a first wedge surface and a second wedge surface converging to form a root.

In one embodiment, the first outer end portion and the second outer end portion of the slot can be each tapered in opposite directions.

In one embodiment, the predetermined volumetric flow profile dQ(x)/dx of molten material through the slot can comprise a predetermined volumetric flow rate at a location of the intermediate portion of the slot that is greater than a predetermined volumetric flow rate of molten material through the slot at the first outer end portion and is greater than a predetermined volumetric flow rate of molten material through the slot at the second outer end portion.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

DETAILED DESCRIPTION OF THE DRAWINGS

These and other features, embodiments and advantages of the present disclosure can be further understood when read with reference to the accompanying drawings, in which:

FIG. 1 schematically illustrates an exemplary embodiment of a glass manufacturing apparatus in accordance with embodiments of the disclosure;

DETAILED DESCRIPTION

Figure 1:
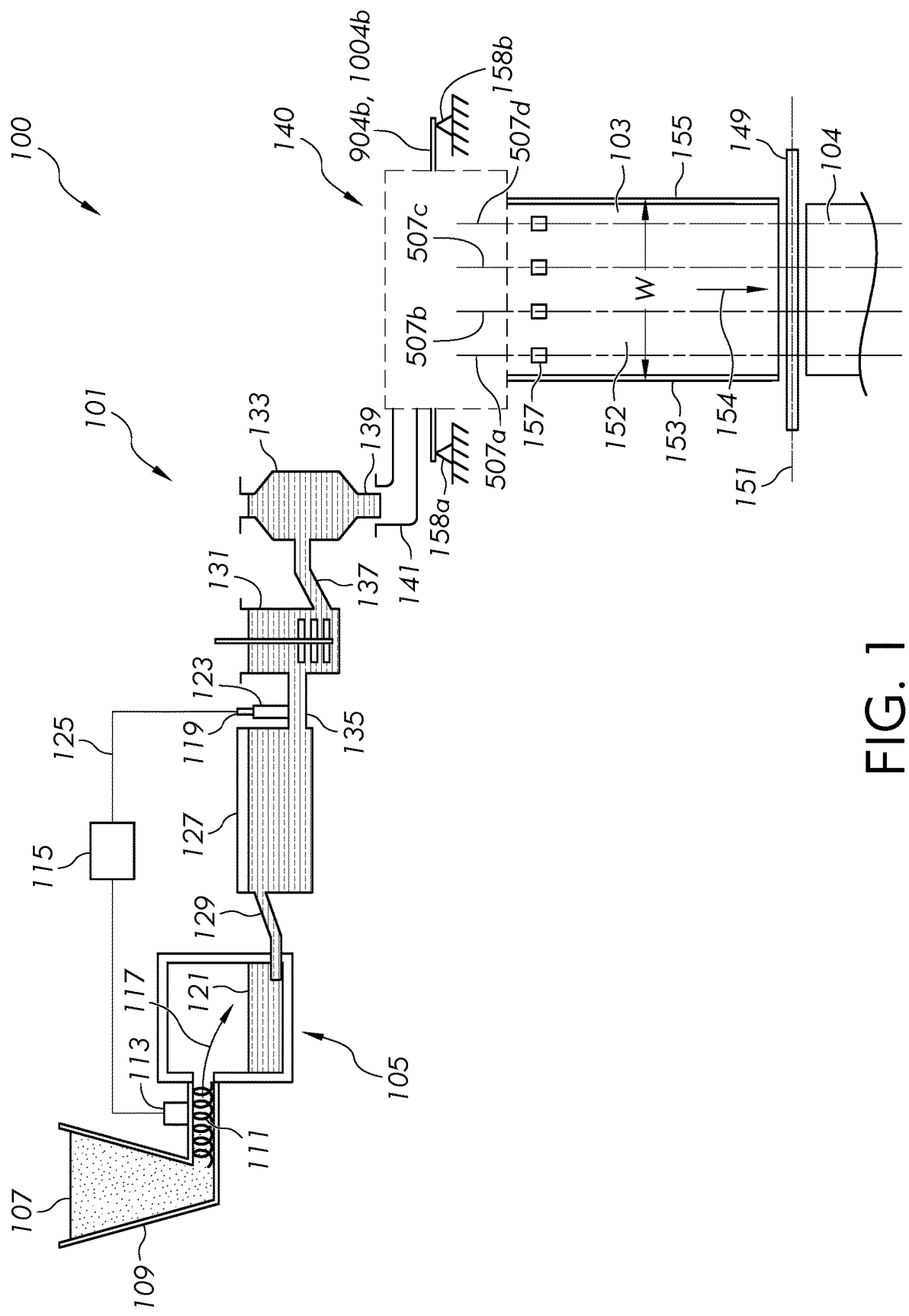

Embodiments will now be described more fully hereinafter with reference to the accompanying drawings in which exemplary embodiments are shown. Whenever possible, the same reference numerals are used throughout the drawings to refer to the same or like parts. However, this disclosure may be embodied in many different forms and should not be construed as limited to the embodiments set forth herein.

Apparatus and methods of the disclosure can provide glass ribbon that may be subsequently divided into glass sheets. In some embodiments, the glass sheets may be provided with four edges forming a parallelogram such as a rectangle (e.g., square), trapezoidal or other shape. In further embodiments, the glass sheets may be a round, oblong, or elliptical glass sheet with one continuous edge. Other glass sheets having two, three, five, etc. curved and/or straight edges may also be provided and are contemplated as being within the scope of the present description. Glass sheets of various sizes, including varying lengths, heights, and thicknesses, are also contemplated. In some embodiments, an average thickness of the glass sheets can be various average thicknesses between oppositely facing major surfaces of the glass sheet. In some embodiments, the average thickness of the glass sheet can be greater than 50 micrometers (μm), such as from about 50 μm to about 1 millimeter (mm), such as from about 100 μm to about 300 μm although other thicknesses may be provided in further embodiments. Glass sheets can be used in a wide range of display applications such as, but not limited to, liquid crystal displays (LCDs), electrophoretic displays (EPD), organic light emitting diode displays (OLEDs), and plasma display panels (PDPs).

As schematically illustrated in FIG. 1, in some embodiments, an exemplary glass manufacturing apparatus 100 can include a glass forming apparatus 101 including a forming vessel 140 (schematically illustrated in FIG. 1) designed to produce a glass ribbon 103 from a quantity of molten material 121. In some embodiments, the glass ribbon 103 can include a central portion 152 disposed between opposite, relatively thick edge beads formed along a first outer edge 153 and a second outer edge 155 of the glass ribbon 103. Additionally, in some embodiments, a glass sheet 104 can be separated from the glass ribbon 103 along a separation path 151 by a glass separator 149 (e.g., scribe, score wheel, diamond tip, laser, etc.). In some embodiments, before or after separation of the glass sheet 104 from the glass ribbon 103, the relatively thick edge beads formed along the first outer edge 153 and the second outer edge 155 can be removed by glass separators 157 along separation paths 507a, 507d to provide the central portion 152 as a high-quality glass sheet 104 having a uniform thickness. Glass separators 157, in some embodiments, may comprise a laser, or a combination of a laser and a quenching stream of fluid.

In some embodiments, the glass manufacturing apparatus 100 can include a melting vessel 105 oriented to receive batch material 107 from a storage bin 109. The batch material 107 can be introduced by a batch delivery device 111 powered by a motor 113. In some embodiments, an optional controller 115 can be operated to activate the motor 113 to introduce a desired amount of batch material 107 into the melting vessel 105, as indicated by arrow 117. The melting vessel 105 can heat the batch material 107 to provide molten material 121. In some embodiments, a glass melt probe 119 can be employed to measure a level of molten material 121 within a standpipe 123 and communicate the measured information to the controller 115 by way of a communication line 125.

Additionally, in some embodiments, the glass manufacturing apparatus 100 can include a first conditioning station including a fining vessel 127 located downstream from the melting vessel 105 and coupled to the melting vessel 105 by way of a first connecting conduit 129. In some embodiments, molten material 121 can be gravity fed from the melting vessel 105 to the fining vessel 127 by way of the first connecting conduit 129. For example, in some embodiments, gravity can drive the molten material 121 to pass through an interior pathway of the first connecting conduit 129 from the melting vessel 105 to the fining vessel 127. Additionally, in some embodiments, bubbles can be removed from the molten material 121 within the fining vessel 127 by various techniques.

In some embodiments, the glass manufacturing apparatus 100 can further include a second conditioning station including a mixing chamber 131 that can be located downstream from the fining vessel 127. The mixing chamber 131 can be employed to provide a homogenous composition of molten material 121, thereby reducing or eliminating inhomogeneity that may otherwise exist within the molten material 121 exiting the fining vessel 127. As shown, the fining vessel 127 can be coupled to the mixing chamber 131 by way of a second connecting conduit 135. In some embodiments, molten material 121 can be gravity fed from the fining vessel 127 to the mixing chamber 131 by way of the second connecting conduit 135. For example, in some embodiments, gravity can drive the molten material 121 to pass through an interior pathway of the second connecting conduit 135 from the fining vessel 127 to the mixing chamber 131.

Additionally, in some embodiments, the glass manufacturing apparatus 100 can include a third conditioning station including a delivery vessel 133 that can be located downstream from the mixing chamber 131. In some embodiments, the delivery vessel 133 can condition the molten material 121 to be fed into an inlet conduit 141. For example, the delivery vessel 133 can function as an accumulator and/or flow controller to adjust and provide a consistent flow of molten material 121 to the inlet conduit 141. As shown, the mixing chamber 131 can be coupled to the delivery vessel 133 by way of a third connecting conduit 137. In some embodiments, molten material 121 can be gravity fed from the mixing chamber 131 to the delivery vessel 133 by way of the third connecting conduit 137. For example, in some embodiments, gravity can drive the molten material 121 to pass through an interior pathway of the third connecting conduit 137 from the mixing chamber 131 to the delivery vessel 133. As further illustrated, in some embodiments, a delivery pipe 139 (e.g., downcomer) can be positioned to deliver molten material 121 to the inlet conduit 141 of the forming vessel 140.

Embodiments of the disclosure can provide an apparatus with a forming vessel comprising a conduit comprising a peripheral wall defining a region extending in a flow direction of the conduit. In some embodiments, the conduit can be configured to contain molten material within the region of the conduit while the molten material flows in the flow direction of the conduit. In addition to a conduit, some forming vessels of the disclosure can optionally comprise a forming wedge for drawing the glass ribbon, a slot for slot drawing the glass ribbon, and/or press rolls for press rolling the glass ribbon.

FIGS. 2-5 and 9-15 illustrate embodiments of forming vessels 140, 401, 501, 1001, 1201, 1401, 1501 that may comprise a conduit 203, 1203 comprising a peripheral wall 205, 1205 comprising an inner surface 1106, 1207 (see FIGS. 11 and 12) defining a region 1101, 1202. The region 1101, 1202 can extend in a flow direction 1103 (see FIGS. 3-5, 11 and 12) of the conduit 203, 1203. As shown in FIGS. 3-6 and 9-12, a first portion 204a, 1204a of the peripheral wall 205, 1205 can comprise at least one slot 301, 403, 503. The at least one slot 301, 403 is illustrated as a single continuous slot although a plurality of slots may be provided that are aligned along a length 1104. In such embodiments, the plurality of slots 301, 403 may include enlarged ends similar to the plurality of slots 503 illustrated in FIGS. 5 and 6. Furthermore, although not shown, the at least one slot 301, 403 and the plurality of slots 503 can include multiple rows of slots that may extend along the length 1104 and parallel to one another.

Figure 9:
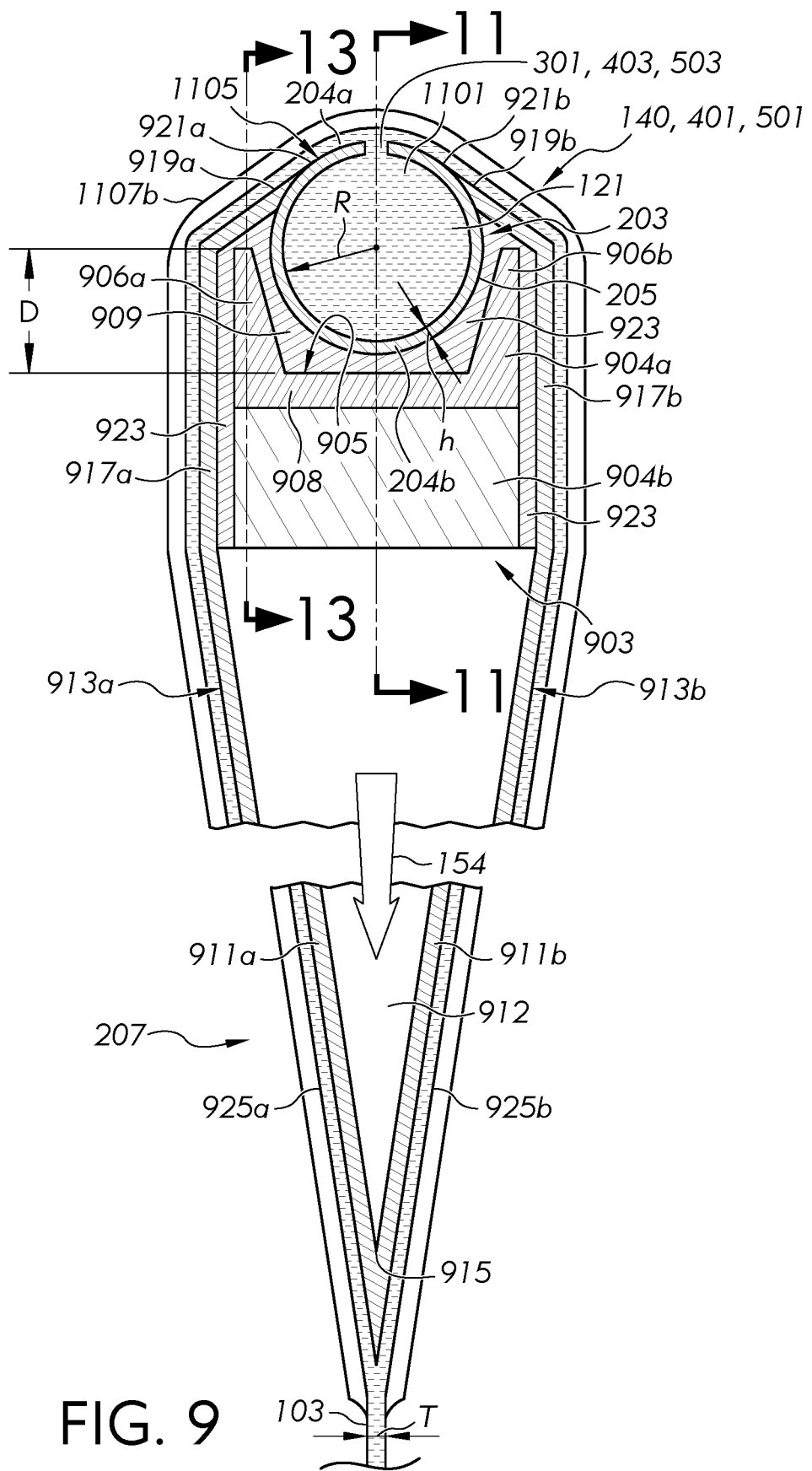
FIG. 9 shows a cross-sectional view of the forming vessel along line 9-9 of FIGS. 3-5.
Figure 10:
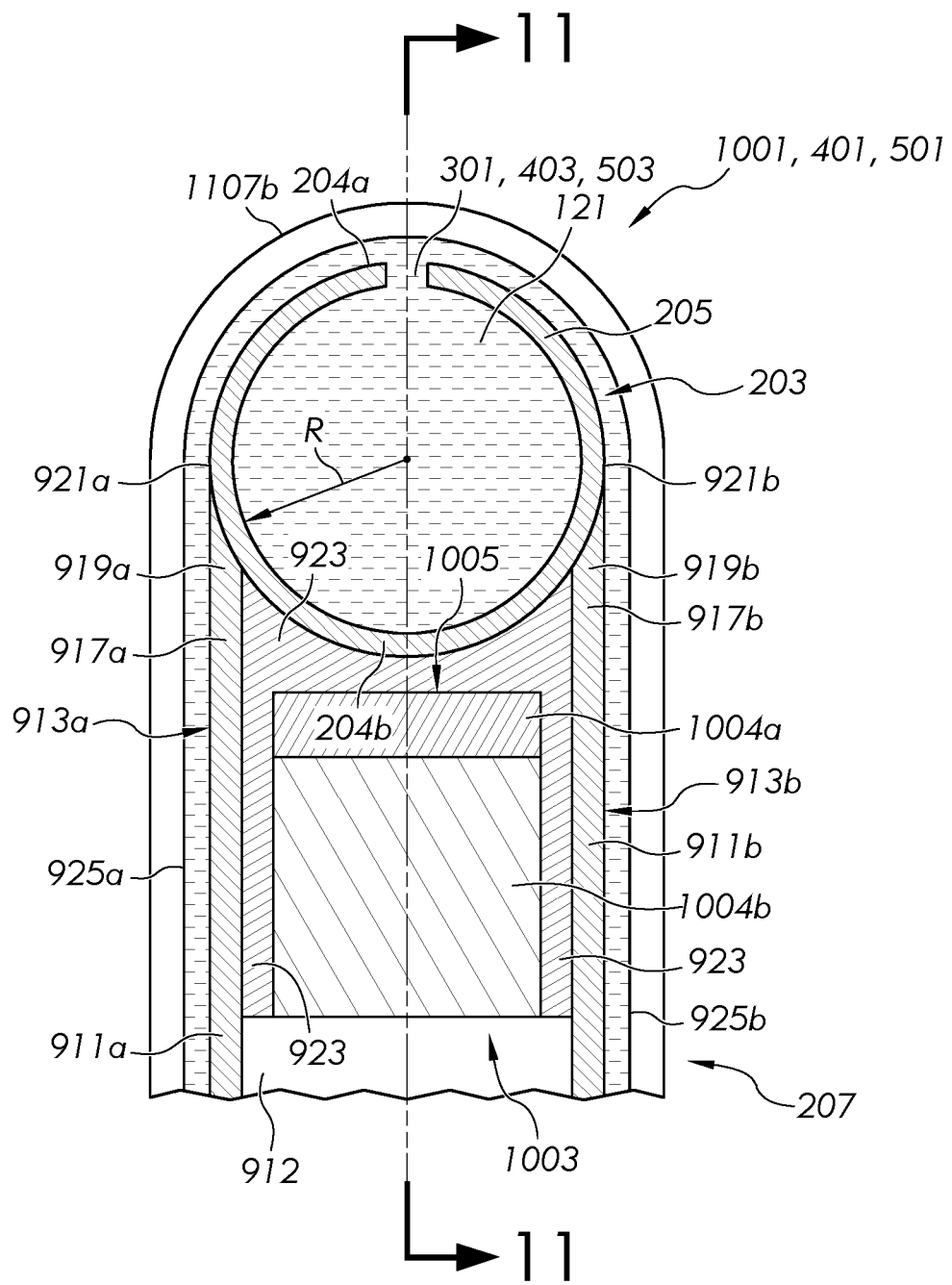
FIG. 10 shows a cross-sectional view of another embodiment of the forming vessel along line 9-9 of FIGS. 3-5.
Figure 11:
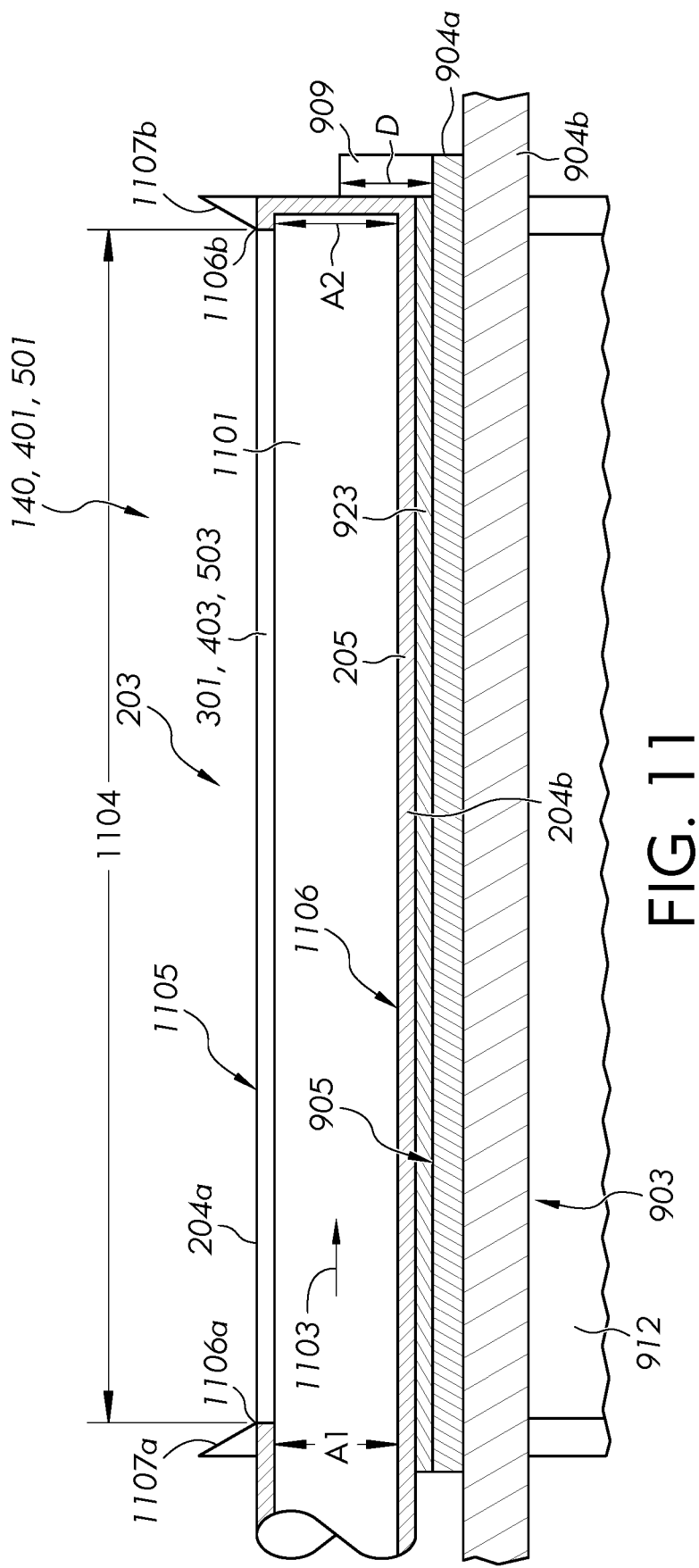
FIG. 11 shows a cross-sectional view of the forming vessels along line 11-11 of FIGS. 9 and 10.
Figure 12:
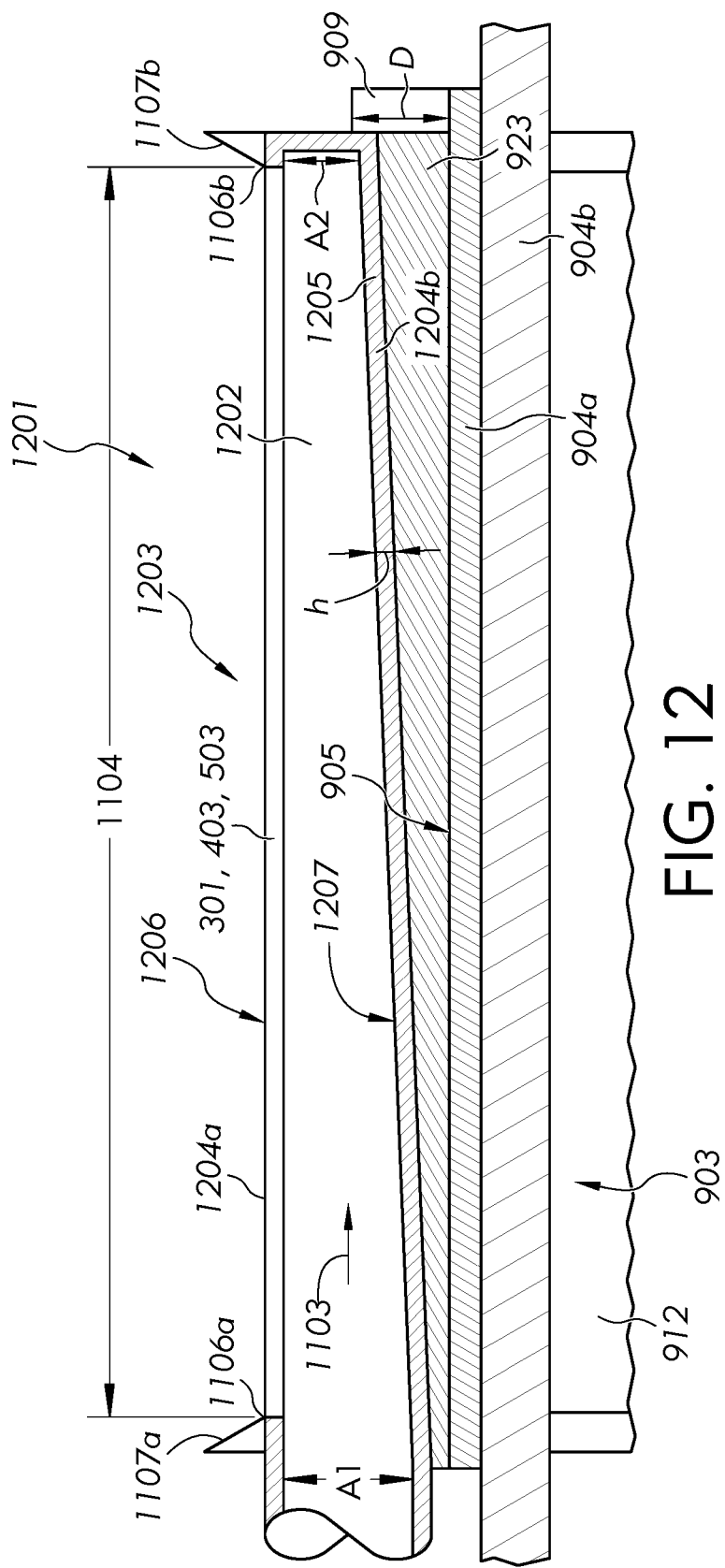
FIG. 12 shows a cross-sectional view of further embodiments of the forming vessels along line 11-11 of FIGS. 9 and 10.
Figure 13:
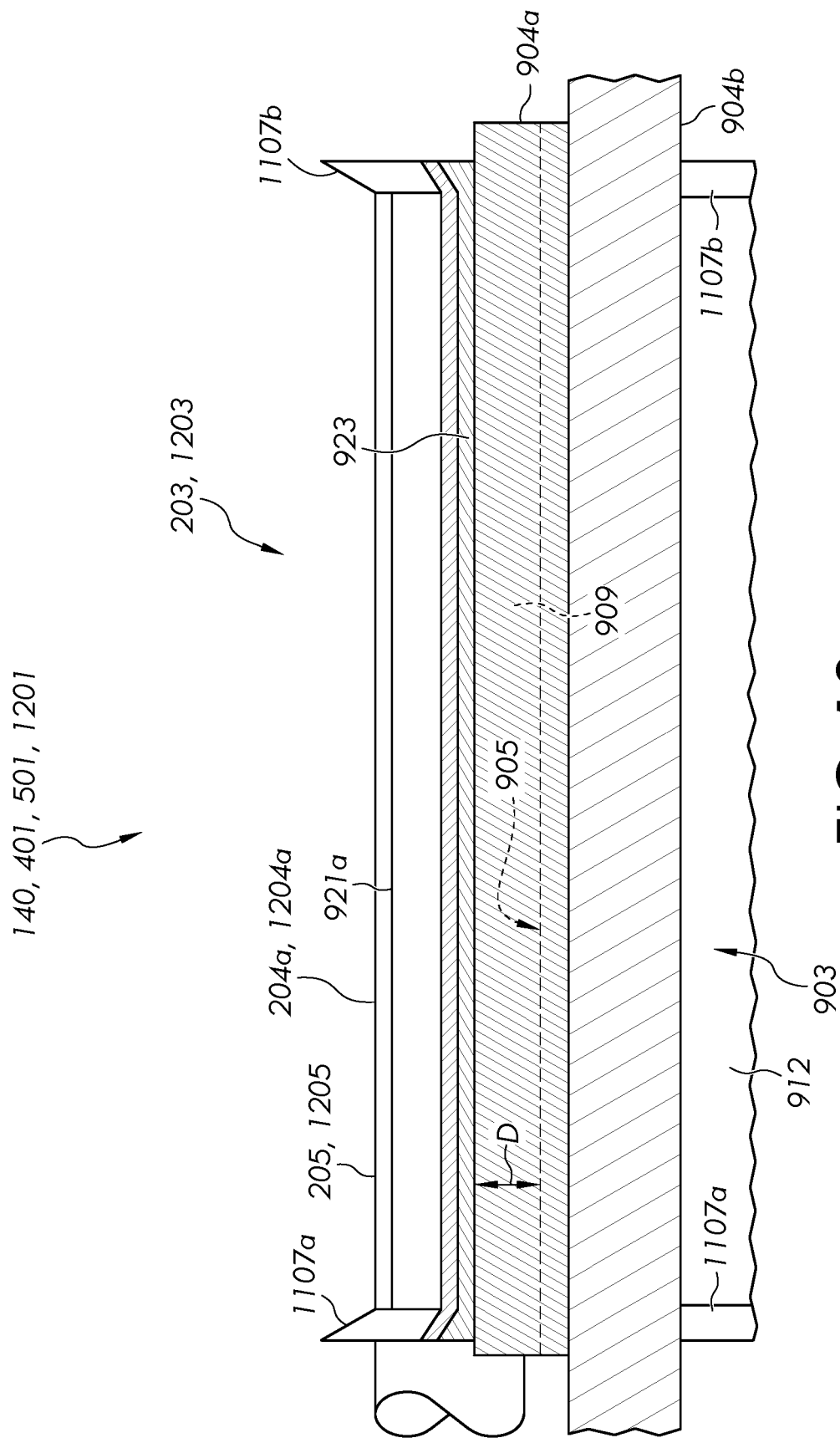
FIG. 13 shows a cross-sectional view of yet further embodiments of the forming vessels along line 13-13 of FIG. 9.

As shown in FIGS. 9-12, the slot(s) 301, 403, 503 can comprise a through-slot that extends through the peripheral wall 205, 1205. As shown in FIGS. 11 and 12, in some embodiments, the slot 301, 403, 503 can be open between an outer peripheral surface 1105, 1206 and the inner surface 1106, 1207 of the peripheral wall 205, 1205 to provide communication between the region 1101, 1202 and the outer peripheral surface 1105, 1206 of the peripheral wall 205, 1205.

Figure 3:
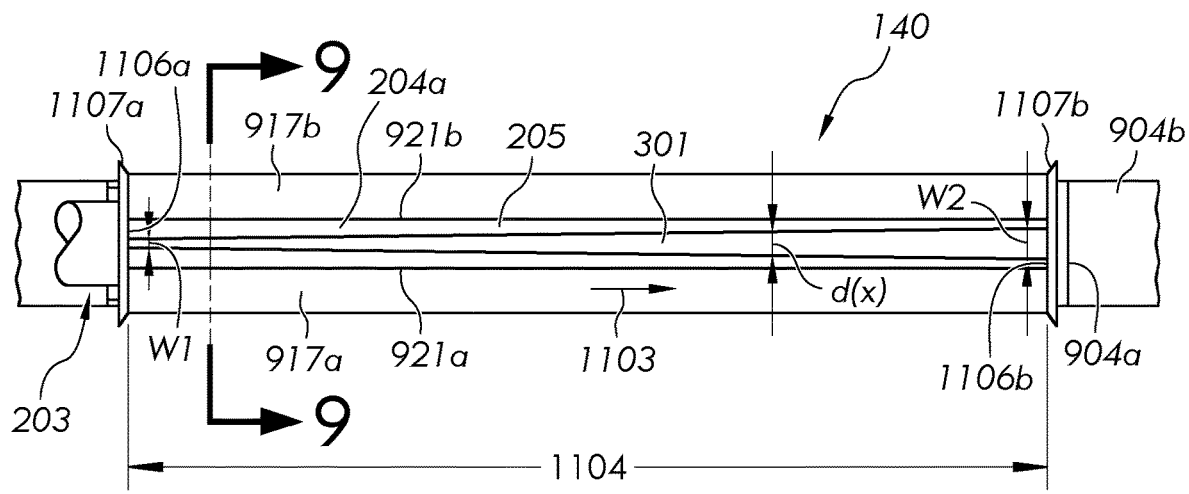
FIG. 3 shows atop view of the forming vessel along line 3-3 of FIG. 2.
Figure 4:
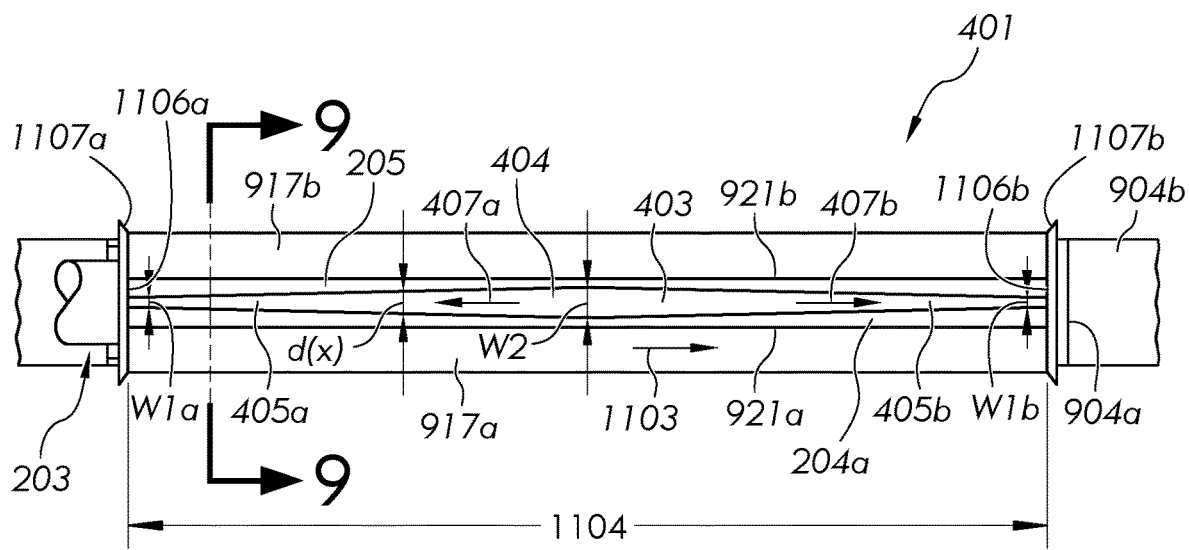
FIG. 4 shows a top view of another embodiment of the forming vessel along line 3-3 of FIG. 2.

As shown in FIGS. 3 and 4, the slot 301, 403 of any of the embodiments of the disclosure can optionally comprise a continuous slot extending a length 1104, such as the entire length 1104, between inner interface locations 1106a, 1106b of opposite edge directors 1107a, 1107b and the outer peripheral surface 1105, 1206 of the peripheral wall 205, 1205 of the conduit 203, 1203. Although not shown, the width of the slot 301 can, for example, be the same along the length 1104 of the slot in any embodiment of the disclosure. Alternatively, in any of the embodiments of the disclosure, the width of the slot can vary along the length 1104. For instance, as shown in FIG. 3, the width of the slot 301 can increase, such as intermittently or continuously increase from a first width W1 to a second width W2 along the flow direction 1103 wherein the second width W2 can be greater than the first width W1. Furthermore, if provided with a continuous increase in width, the slot width can optionally continuously increase at a constant rate although continuously increasing at a changing rate can also be provided in further embodiments. For instance, as shown in FIG. 3, the slot 301 can optionally increase continuously at a constant rate in the flow direction 1103 from the first width W1 to the second width W2. Increasing, such as continuously increasing the width of the slot 301 in the flow direction 1103, can help provide substantially the same volumetric flow rate of molten material through the slot 301 along the length 1104 of the slot 301 in use.

In some embodiments, the single continuous slot 301 shown in FIG. 3 may be provided as a plurality of slots aligned along the length 1104. Furthermore, the plurality of slots, if provided, may optionally comprise enlarged ends at the bridge between the slots similar to the enlarged ends of FIGS. 5 and 6. Furthermore, the plurality of slots may be designed to approximate a desired normalized volumetric profile. In some embodiments, a single slot 301 may be provided as shown in FIG. 3. In further embodiments, the at least one slot 301 can comprise two slots that may be provided with the portion (similar to portion 617 discussed below) between the two slots to provide a strengthening bridge as discussed below. The portion between the two slots can be located in the symmetrical center of the length 1104 shown in FIG. 3. With an embodiment including two slots, the corresponding ends of the slot may optionally comprise enlarged portions (similar to FIGS. 5 and 6) to help compensate for a loss of flow occurring due to the portion between the slots such as a bridge. In further embodiments, the corresponding ends of the two slots may not comprise enlarged ends to provide a desired reduction of flow in the central area of the slot in some embodiments. In further embodiments, the at least one slot 301 can comprise three or more slots that are aligned along the length 1104.

Figure 7:
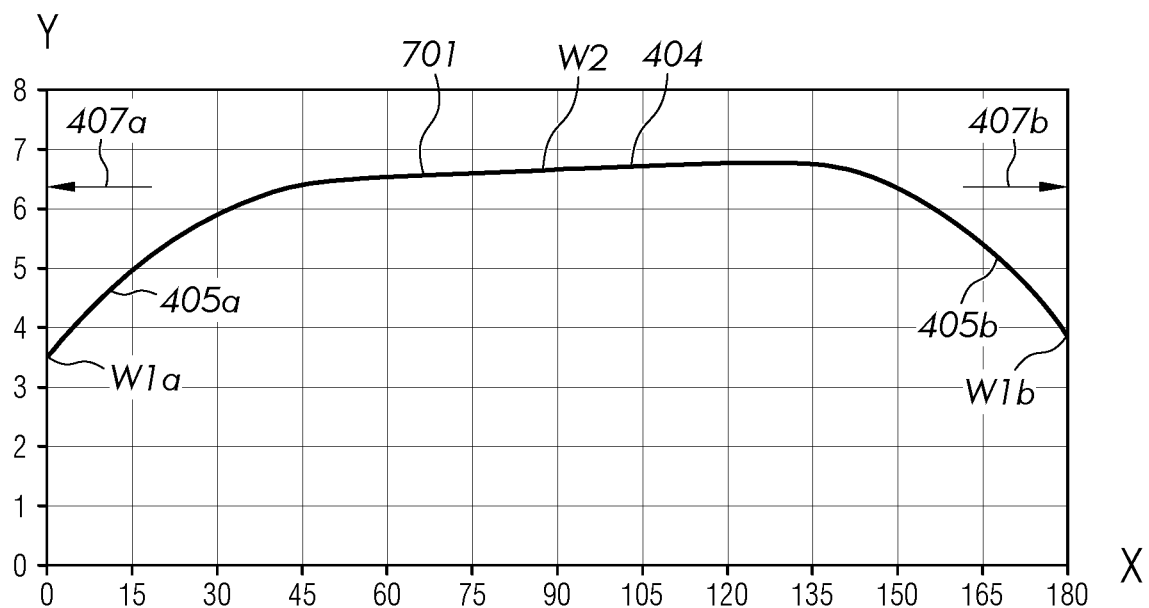
FIG. 7 is a graph illustrating a determined slot opening width profile along the length of a slot of FIG. 4.
Figure 8:
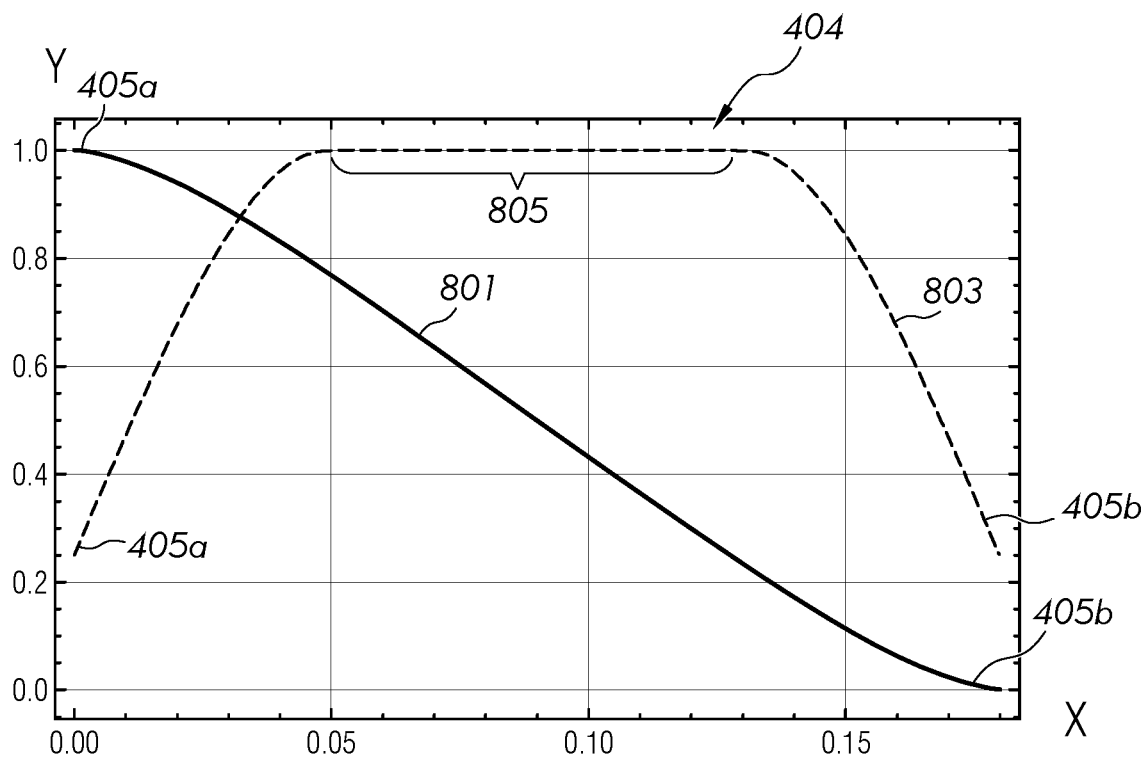
FIG. 8 is a graph illustrating a modeled normalized volumetric flow rates along the length of the slot with a slot profile of FIG. 7.

In further embodiments, as shown in FIG. 4, the slot 403 can vary along the length 1104 by decreasing, such as intermittently or continuously decreasing from an intermediate portion 404 comprising a second width W2 to a first outer end portion 405a including a first end width W1a and a second outer end portion 405b including a second end width W1b. As shown, the second end width W2 can be greater than the first end width W1a of the first outer end portion 405a and the second end width W1b of the second outer end portion 405b. Indeed, as shown in FIG. 4, the first outer end portion 405a can taper in a first direction 407a opposite the flow direction 1103 and the second outer end portion 405b can taper in a second direction 407b opposite the first direction 407a and in the flow direction 1103. In some embodiments, as shown, the first and second end width W1a, W1b can be identical to one another at both outer end portions 405a, 405b of the slot 403. In further embodiments, one of the end widths can be greater than the other end width while both end widths may be less than the second width. For instance, FIG. 7 illustrates one embodiment of a slot width profile 701 of a continuous slot similar to FIG. 4 with the slot width indicated on the vertical or "Y" axis relative to the length of the slot indicated on the horizontal or "X" axis. As shown in FIG. 7, the first end width W1a of the first outer end portion 405a can start at about 3.5 while the second end width W1b of the second outer end portion 405b can end with a greater width of about 3.8. As further shown in FIG. 7, the second end width W2 of the intermediate portion 404 can be greater than both the first end width W1a and the second end width W1b. FIG. 8 shows modeled normalized volumetric flow rates on the vertical or "Y" axis relative to the length of the slot indicated on the horizontal or "X" axis of the slot width profile 701 of FIG. 7. The normalized plot 801 represents the normalized volumetric flow rate of the molten material 121 passing through the region 1101 of the conduit 203 where the volume of molten material 121 passing through the region 1101, that has not yet passed through the slot 403, gradually decreases from the first outer end portion 405a to the second outer end portion 405b. The normalized plot 803 represents the normalized volumetric flow rate of molten material 121 passing through the slot 403. As indicated by the normalized volumetric flow profile 803, the slot width of the intermediate portion 404 illustrated in FIG. 7 can provide a normalized volumetric flow central region 805 that gradually tapers at each of the first outer end portion 405a and second outer end portion 405b. As shown, the tapering of the normalized volumetric flow profile 803 at the first outer end portion 405a can be approximately symmetrically disposed relative to the second outer end portion 405b. Thus, the slot width profile 701 of FIG. 7 can provide a normalized volumetric flow of molten material through the slot 403 in the central region with similar reduced volumetric flows at the first outer end portion 405a and the second outer end portion 405b of the slot 403. Such a normalized volumetric flow profile 803 can allow more molten material 121 to pass through the intermediate portion 404 as compared to the outer end portions 405a, 405b. Reducing the volumetric flow of molten material at the outer end portions, as shown, may provide embodiments with a reduced amount of material feeding edge beads of ribbon being drawing from the forming device to reduce the size and/or thickness of such edge beads.

The slot width profile 701 of FIG. 7 is shown as a continuous plot representing the continuous slot 403 shown in FIG. 4. In some embodiments, as mentioned previously, the single continuous slot 403 shown in FIG. 4 may be provided as a plurality of slots aligned along the length 1104. In some embodiments with a plurality of slots, the slot width profile may appear similar to the slot width profile 701 of FIG. 7 but shown in segments representing the segmented slots aligned long the length. Furthermore, the plurality of slots, if provided, may optionally comprise enlarged ends at the bridge between the slots similar to the enlarged ends of FIGS. 5 and 6. Furthermore, the plurality of slots may be designed to approximate the normalized volumetric profile 803 shown in FIG. 8. In some embodiments, a single slot 403 may be provided as shown in FIG. 4. In further embodiments, two slots may be provided with the portion (similar to portion 617 discussed below) between the two slots to provide a strengthening bridge as discussed below. The portion between the two slots can be located in the symmetrical center of the length 1104 shown in FIG. 4. With an embodiment including two slots, the corresponding ends of the slot may optionally comprise enlarged portions (similar to FIGS. 5 and 6) to help compensate for a loss of flow occurring due to the portion between the slots such as a bridge. In further embodiments, the corresponding ends of the two slots may not comprise enlarged ends to provide a desired reduction of flow in the central area of the slot in some embodiments. In further embodiments, three or more slots may be provided that are aligned along the length 1104.

Embodiments of the disclosure can include methods of producing a slot, such as slot 301, 403 discussed above with respect to FIGS. 3, 4, 7 and 8. For example, with reference to FIG. 4, the method can include determining a width profile d(x) of the slot 403 to achieve a predetermined volumetric flow profile dQ(x)/dx of molten material (e.g., see 803 in FIG. 8) through the slot 403 as a function of:

$$\frac{d}{dx}\left(\frac{K(x)}{n}\frac{dQ(x)}{dx}\mu(x)\right) = \frac{8}{\pi R^4}\mu(x)Q(x)$$

where μ(x) represents a predetermined viscosity of a molten material, R represents an internal radius of the conduit 203 (see FIGS. 9 and 10), n represents a number of slots in parallel, and $$K(x) = \frac{12 \cdot h}{d(x)^3} + \frac{10}{d(x)^2}$$

where "h" (see FIGS. 9 and 10) represents a thickness of the peripheral wall 205 of the conduit 203. As shown in FIGS. 3 and 4, for example, "n" would equal "1" since there is a single slot extending along the length 1104. Although not shown, if there were two slots extending parallel to one another along the length 1104, then "n" would equal "2". Determining the width profile d(x) can be conducted on the slot 301, 403 that comprises a continuous slot along the length 1104. In further embodiments, the width profile d(x) can be determined for each slot of a plurality of slots aligned and extending along the length 1104 in further embodiments. The method can further include generating (e.g. machining) the slots 301, 403 based on the determined width profile d(x). For example, the method can include generating the slot 403 with the determined width profile d(x) (e.g., see slot width profile 701 in FIG. 7). Alternatively, the generating the slot 403 based on the determined width profile d(x) can include adding or subtracting from the determined width profile d(x) to compensate for predicted changes in the determined width profile d(x) based on predicted thermal expansion, elastic deformation and/or non-elastic deformation (e.g., creep or other permanent deformation) that can alter the dimensions of the slot that can be calculated or estimated over the expected life of the conduit and/or during the expected length of a production campaign with molten material passing through the conduit 203 in use. Compensation for such predicted changes can ultimately lead to extension of the lifetime of the apparatus and/or more economical use of materials (e.g., thinner platinum walls). The generated slot 301, 403 based on the determined width d(x) extends through the peripheral wall 205 of the conduit 203. Throughout the disclosure, some exemplary embodiments of generating the slot(s) can comprise machining the slot(s) (e.g., machining by cutting, sawing, drilling, or grinding). The actual width profile d(x) generated into the conduit 203 may differ from the desired width profile d(x) based on generating (e.g., machining) tolerances, for example, within 100 micrometers or less, within 50 micrometers or less, within 20 micrometers or less, within 10 micrometers or less of the desired width at a particular location of the desired width profile d(x).

Once the slot 403 is generated as discussed above, as shown generally in FIG. 4 and also by the example slot width profile 701 of FIG. 7, the slot 403 can comprise the first outer end portion 405a, a second outer end portion 405b and an intermediate portion 404 positioned between the first outer end portion 405a and the second outer end portion 405b. As further illustrated by the volumetric flow profile dQ(x)/dx of molten material (e.g., see 803 in FIG. 8), the predetermined volumetric flow profile dQ(x)/dx of molten material through the slot 403 can comprise a volumetric molten material flow rate at a location of the intermediate portion that is greater than at a location of the first outer end portion 405a and a location of the second outer end portion 405b. With such a configuration, as shown in FIG. 7, the second width W2 of the intermediate portion 404 can be greater than first end width W1a of the first outer end portion 405a, and the second width W2 of intermediate portion 404 can further be greater than the second end width W1b of the second outer end portion 405b. Furthermore, as shown in FIGS. 4 and 7, the first outer end portion 405a can be tapered in the direction 407a and the second outer end portion 405b can be tapered in the direction 407b opposite the direction 407a.

Consequently, as discussed above, embodiments of the disclosure can achieve predetermined volumetric flow profile dQ(x)/dx of molten material through generating (e.g., machining) of a slot or a plurality of slots based on a determined width profile d(x) of the slot or plurality of slots into a conduit. Once generated, the slot(s) can deliver the desired volumetric flow profile dQ(x)/dx through the slot(s) to provide desired flow characteristics of the molten material flowing through the slot(s) and thereby provide desired glass ribbon attributes. For example, as discussed above, a predetermined volumetric flow profile dQ(x)/dx may be presented to help reduce flow at the outer edges of the slot for a desired reduced flow of molten material forming the edges of the glass ribbon than the material forming the central portion of the glass ribbon. Methods of the disclosure can then determine the width profile d(x) based on the desired predetermined volumetric flow profile dQ(x)/dx to more accurately generate a slot or plurality of slots with a corresponding width profile d(x) that can provide an actual volumetric flow profile dQ(x)/dx that more closely matches the desired predetermined volumetric flow profile dQ(x)/dx.

In further embodiments, there may be a desire to predict a volumetric flow profile dQ(x)/dx of molten material flowing through an existing slot or a plurality of slots already provided in a peripheral wall of a conduit. For instance, methods of the disclosure can predict a volumetric flow profile without necessarily needing to install and run actual molten material through the conduit to determine the actual volumetric flow profile of a given forming vessel. In some embodiments, methods can determine a predicated volumetric flow profile dQ(x)/dx through the slot or a plurality of slots in various conduits and then select the conduit that is determined to provide the most desirable volumetric flow profile dQ(x)/dx for a particular application. The method of predicting the volumetric flow profile dQ(x)/dx can include measuring a width profile d(x) of the existing slot (e.g., an existing slot of a single slot or an existing slot of a plurality of slots) in the conduit. The method can then determine a volumetric flow profile dQ(x)/dx of molten material through the slot as a function of $$\frac{d}{dx}\left(\frac{K(x)}{n}\frac{dQ(x)}{dx}\mu(x)\right) = \frac{8}{\pi R^4}\mu(x)Q(x)$$

where μ(x) is a predetermined viscosity of a molten material, R represents an internal radius of the conduit, n represents a number of slots in parallel, and $$K(x) = \frac{12 \cdot h}{d(x)^3} + \frac{10}{d(x)^2}$$

where "h" represents a thickness of the peripheral wall of the conduit.

In embodiments with a plurality of slots, the volumetric flow profile dQ(x)/dx may be determined for each slot of the plurality of slots and then the overall flow profile through the plurality of slots can be determined based on the addition of the volumetric flow profile through each slot of the plurality of slots.

In some embodiments, an apparatus can comprise a conduit 203 comprising a peripheral wall 205 defining the region 1101 extending in the flow direction 1103 of the conduit 203. The first portion 204a of the peripheral wall 205 can comprise the slot 403 extending through the peripheral wall 205. The slot 403 can be in fluid communication with the region 1101 and comprise the length 1104 extending between a first end of the first outer end portion 405a and a second end of the second outer end portion 405b. A width profile d(x) of the slot 403 along the length 1104 of the slot 403 can be configured to achieve a predetermined volumetric flow profile dQ(x)/dx of molten material through the slot 403 as a function of:

$$\frac{d}{dx}\left(\frac{K(x)}{n}\frac{dQ(x)}{dx}\mu(x)\right) = \frac{8}{\pi R^4}\mu(x)Q(x)$$

where μ(x) represents a predetermined viscosity of a molten material, R represents an internal radius of the conduit, n represents a number of slots in parallel, and $$K(x) = \frac{12 \cdot h}{d(x)^3} + \frac{10}{d(x)^2}$$

where "h" represents a thickness of the peripheral wall 205 of the conduit 203.

In embodiments with a plurality of slots, each slot of the plurality of slots can be configured to achieve the volumetric flow profile dQ(x)/dx so that the slots, in combination, approximate the desired overall volumetric flow profile dQ(x)/dx.

As discussed more fully below (e.g., see FIG. 9), a forming wedge 207 can be positioned downstream from the slot 403, wherein the forming wedge 207 can comprise a first wedge surface 913a and a second wedge surface 913b converging to form a root 915. As shown in FIG. 4 and discussed above, the first outer end portion 405a and the second outer end portion 405b of the slot 403 can each be tapered in opposite respective directions 407a, 407b. As shown by the normalized volumetric flow profile 803 in FIG. 8, in some embodiments, the predetermined volumetric flow profile dQ(x)/dx of molten material 121 through the slot 403 can provide a predetermined volumetric flow rate of molten material 121 through the slot 403 at a location of the intermediate portion 404 that is greater than a predetermined volumetric flow rate of molten material through the slot 403 at the first outer end portion 405a and greater than a predetermined volumetric flow rate of molten material 121 through the slot 403 at the second outer end portion 405b.

Figure 5:
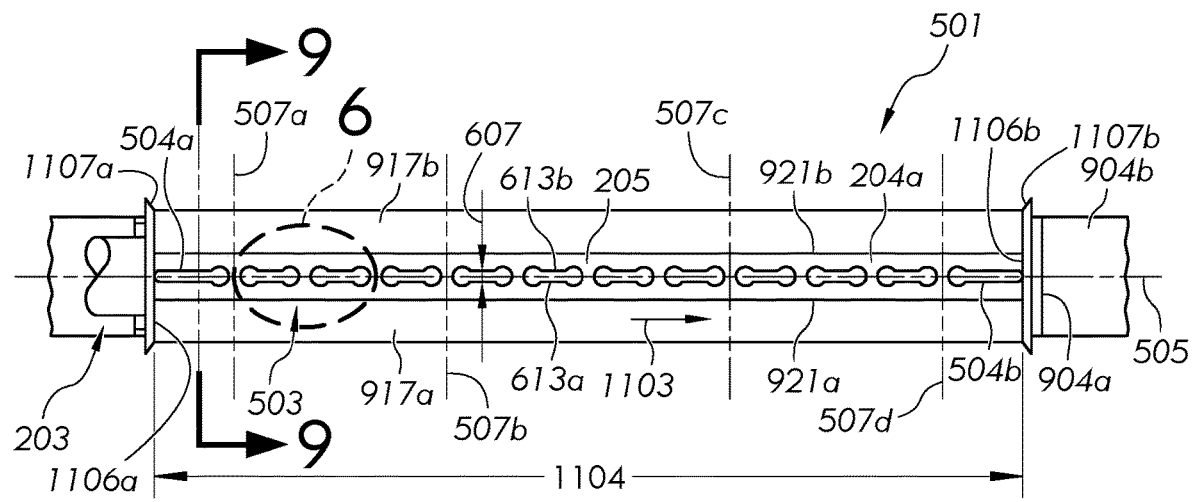
FIG. 5 shows atop view of yet another embodiment of the forming vessel along line 3-3 of FIG. 2.
Figure 6:
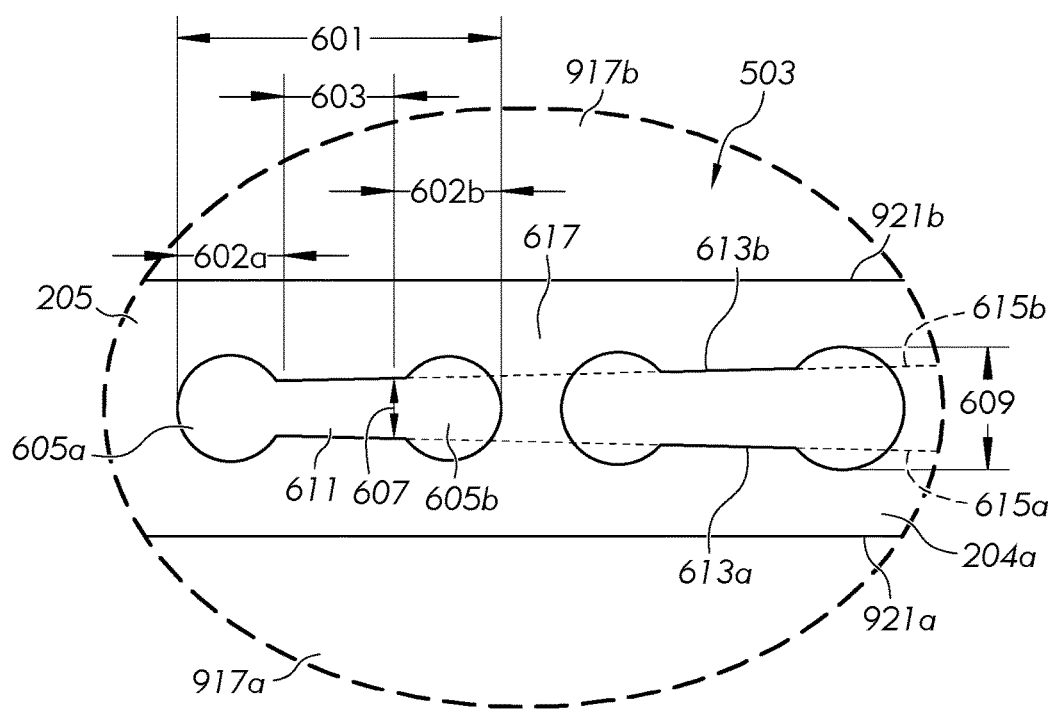
FIG. 6 shows an enlarged view of a portion of the forming vessel taken at view 6 of FIG. 5.

In any of the embodiments of the disclosure, the conduits may be provided as a plurality of slots that may be provided with at least one enlarged portion at one of the end portions of the slots although further embodiments may include ends that are not enlarged. For instance, with reference to FIG. 5, the forming vessel 501 of the apparatus may include the conduit 203 discussed above. As previously discussed, the conduit 203 can also include the region 1101 (see FIG. 9) extending in the flow direction 1103 (see FIG. 5). As shown, the first portion 204a of the peripheral wall 205 can include a plurality of slots 503 extending through the peripheral wall 205. Each slot of the plurality of slots 503 can be provided in fluid communication with the region 1101. As shown in FIG. 6, at least one slot of the plurality of slots 503 can comprise an intermediate portion 611 with an intermediate length 603 extending between a first end portion 605a with a first end length 602a and a second end portion 605b with a second end length 602b. The first end portion 605a, second end portion 605b and intermediate portion 611 are all included within an overall length 601 of the slot that comprises the sum of the intermediate length 603 of the intermediate portion 611, the first end length 602a of the first end portion 605a and the second end length 602b of the second end portion 605b. For purposes of this application, the first end portion 605a is considered that portion of the slot within 33% of the overall length 601 from a first outer end of the slot. Likewise, for purposes of this application the second end portion 605b is considered that portion of the slot that is within 33% of the overall length 601 of a second outer end of the slot. The intermediate portion 611 is considered that portion of the slot positioned between the first end portion 605a and the second end portion 605b. Thus, as shown in FIG. 6, the first end length 602a and the second end length 602b each comprise 33% of the overall length 601 of the slot with the intermediate length 603 comprising 34% of the overall length 601 of the slot.

As shown, the first end portion 605a and the second end portion 605b each include a corresponding maximum width 609 along a direction perpendicular to the overall length 601 of the slot. In some embodiments, an enlarged portion associated with an end portion can include a maximum width that is equal to the maximum width of the corresponding end portion. For example, as shown in FIG. 6, each of the enlarged portions can include a maximum width that is equal to the maximum width 609 of each corresponding end portion 605a, 605b.

Furthermore, as shown, an enlarged portion of the slot may be associated with one or both of the end portions 605a, 605b. For example, in the illustrated embodiment, central slots of the plurality of slots 503 can comprise an enlarged portion associated with both end portions 605a, 605b such as the illustrated bulbous portion. As shown in FIG. 5, in some embodiments, outer slots 504a, 504b of the plurality of slots 503 can comprise a single enlarged portion associated with one of the end portions 605a, 605b although the outer slots 504a, 504b may include enlarged portions associated with both end portions 605a, 605b in further embodiments. In still further embodiments, although not shown, one or more of the central slots (i.e., the slots between the outer slots 504a, 504b) can comprise a single enlarged portion associated with one of the end portions 605a, 605b of the slot that includes a maximum width 609 that is greater than a maximum width 607 of the intermediate portion 611. Alternatively, as shown, in some embodiments, the end portions 605a, 605b can each comprise a maximum width 609 that is greater than a maximum width 607 of the intermediate portion 611.

As shown, in some embodiments, the length of both of the enlarged portions associated with the end portions 605a, 605b may not be identical to the corresponding lengths 602a, 602b of the corresponding end portions 605a, 605b. For instance, as shown, each enlarged end associated with the end portions 605a, 605b may have a length that is less than the corresponding first end length 602a and the corresponding second end length 602b. In further embodiments, although not shown, one or both enlarged ends, if provided, may have a length that is greater than or equal to the corresponding first end length 602a and the corresponding second length 602b. Thus, the length of the enlarged end may be greater than, less than or equal to the corresponding length 602a, 602b of the corresponding end portion 605a, 605b. Furthermore, as shown, the length of the enlarged portion associated with the first end portion 605a is equal to the length of the enlarged portion associated with the second end portion 605b. In further embodiments, although not shown, the length of the enlarged end portion associated with the first end portion 605a may be less than or greater than the length of the enlarged portion associated with the second end portion 605b.

The width 607 of the intermediate portion 611 can be defined between a first side 613a and a second side 613b of the slot in a direction perpendicular to a direction of the length 601 of the slot. In some embodiments, as shown, the sides 613a, 613b can each be substantially straight although other shaped sides may be provided in further embodiments. As shown in FIG. 5, each slot of the plurality of slots 503 may include sides 613a, 613b that are straight and parallel with respect to one another. For example, with reference to FIG. 5, all of the slots may include corresponding sides 613a, 613b that are straight and parallel with respect to one another with all of the sides 613a aligned along a first common linear path and all of the sides 613b aligned along a second common linear path with the width 607 between the sides 613a, 613b of each slot being identical with one another. Although not shown, a plurality of slots may be provided with sides 613a, 613b that are straight and parallel with respect to one another with at least one slot having a width 607 between the sides 613a, 613b that is different from the width 607 between the sides 613a, 613b of another slot of the plurality of slots.

FIG. 6 illustrates alternative embodiments, where the sides 613a, 613b of the intermediate portion 611 may be substantially straight and arranged at an acute angle relative to one another such that the sides 613a, 613b travel along corresponding paths 615a, 615b to converge toward one another along a direction (e.g., direction 407a and/or 407b). In some embodiments, the intermediate length 603 of the slot can continuously decrease in the flow direction 1103 or, as shown, continuously decrease in a direction that is opposite the flow direction 1103. As such, in some embodiments, a first set of slots and a second set of slots of the plurality of slots 503 can each include sides 613a, 613b that follow paths 615a, 615b that taper in the flow direction 1103 for the first set of slots and the direction opposite the flow direction 1103 for the second set of slots in a manner similar to that shown in FIG. 4. Alternatively, in some embodiments, all of the slots of the plurality of slots 503 may have corresponding sides 613a, 613b that taper in the flow direction 1103 or opposite the flow direction (e.g., in a manner similar to that shown in FIG. 3).

Although not shown, an effective taper in one or both directions 407a, 407b (e.g., similar to that shown in FIGS. 3 and/or 4) can be achieved with a plurality of slots including sides 613a, 613b of the intermediate portion 611 that are straight and parallel with one another but including widths 607 that are sequentially smaller in one or more of the directions 407a, 407b. For instance, in some embodiments, the width 607 of the intermediate portion 611 of the first end slot may include a width 607 similar to W1 in FIG. 3 and an opposite end slot may include an intermediate portion 611 with a width 607 similar to the W2 shown in FIG. 3 with the width 607 of each intermediate portion 611 of each of the slots in between the end slots sequentially increasing from the first end slot to the second end slot in the flow direction 1103. In some alternative embodiments, the width 607 of the first end slot may include a width 607 similar to the width W1a of the outer end portion of the slot shown in FIG. 4 and an opposite second end slot may include a width 607 similar to the width W1b of the outer end portion of the slot shown in FIG. 4. The width 607 of the intermediate portion 611 of a first set of slots may sequentially decrease in the direction opposite the flow direction 1103 from a width 607 similar to the width W2 of the intermediate portion of the slot shown in FIG. 4 to the width 607 similar to the width W1a of the outer end portion of the slot shown in FIG. 4. Likewise, the width 607 of the intermediate portion 611 of a second set of slots may sequentially decrease in the flow direction 1103 from a width 607 similar to the width W2 of the intermediate portion of the slot shown in FIG. 4 to the width 607 similar to the width W1b of the outer end portion of the slot shown in FIG. 4.

Consequently, the width 607 of each slot of the plurality of slots 503, and alternative embodiments discussed with respect to FIGS. 3-7, can be the same or different from one another to achieve the desired molten material profile flowing through the slots in use.

In some embodiments, as shown in FIG. 6, a portion 617 of the conduit 203 can space apart each slot of a pair of adjacent slots of the plurality of slots 503. A cross section of the conduit 203 at the portion 617 along a cross-sectional plane that is parallel to the cross-sectional plane along line 9-9 may appear similar to FIG. 9 but comprising an uninterrupted wall with the slot being replaced with the portion 617. Thus, the portion 617 is part of a segment of the conduit with an uninterrupted peripheral wall 205 that strengthens the conduit 203. Indeed, the portions 617 can help maintain the dimensions of the conduit 203 and the dimensions of the slots 503.

In some embodiments, the slots may include enlarged ends such as the illustrated bulbous ends to help increase molten material flow at the ends and thereby provide extra molten material at the ends of adjacent slots to mend the discontinuity of the molten streams caused by the portion 617 of the conduit 203. While the enlarged ends are provided at each end of the corresponding pair of slots, in some embodiments, one end may be provided with the enlarged end. To provide the one or more enlarged ends, a maximum width 607 along the intermediate length 603 of the intermediate portion 611 of each slot can be less than a maximum width 609 of the first end portion 605a and/or a maximum width 609 of the second end portion 605b. For instance, as shown in FIG. 6 the maximum width 607 along the intermediate length 603 of the intermediate portion 611 can be less than the maximum width 609 of both the first end portion 605a and the second end portion 605b. The enlarged end portions are illustrated as bulbous end portions with a circular shape although noncircular shapes may be provided in further embodiments.

In some embodiments, the plurality of slots 503 may be provided with any number of slots greater than three slots as shown in FIG. 5. In further embodiments, only two slots may be provided with the portion 617 between the two slots to provide a strengthening bridge. The portion 617 between the two slots can be located in the symmetrical center of the length 1104 shown in FIG. 5. With an embodiment including two slots, the corresponding ends of the slot defining the portion 617 may optionally comprise enlarged portions to help compensate for a loss of flow occurring due to the portion 617 between the slots. In embodiments with two slots, some embodiments may provide that only the inner ends of the corresponding slots include the enlarged portion wherein the slots may include corresponding configurations similar to slots 504a, 504b. In further embodiments, three or more slots may be provided that are aligned along the length 1104.

As can be appreciated in FIGS. 9 and 12, the slot 301, 403 or plurality of slots 503 can be provided in the first portion 204a, 1204a of the peripheral wall 205, 1205 at the uppermost apex of the conduit 203, 1203 in any of the embodiments of the disclosure. In some embodiments, the slot(s) 301, 403, 503 of any of the embodiments of the disclosure may be aligned along a linear path. For example, as shown in FIG. 5, each slot of the plurality of slots 503 may be aligned with respect to one another along a linear path 505. In further embodiments, as shown in FIGS. 3 and 4, the slot 301, 403 can extend continuously along the linear path. As further shown, the linear path that the slot(s) extend along can extend in the flow direction 1103 of the conduit. Furthermore, as shown in FIG. 9, in some embodiments, the linear flow path of the slot(s) 301, 403, 503, the flow direction 1103, and the root 915 of the forming wedge 209 can all extend along a common plane. As shown in FIG. 9, the common plane can comprise a vertical plane extending along the illustrated section line 11-11 and bisecting the conduit 203, the slot(s) 301, 403, 503 and the root 915. Bisecting the conduit, root, and slot(s) with the slot(s) 301, 403, 503 along the uppermost apex can help evenly divide the molten material exiting the slot(s) into oppositely flowing streams 925a, 925b. Although not shown, a plurality of slots may be provided that extend such that the vertical plane that bisects the conduit can also bisect the slot or can be parallel to the slot. For example, one or more pairs of slots may be symmetrically disposed about the vertical plane that bisects the conduit, wherein each slot of the pair of slots provides a dedicated flow of molten material at each corresponding side of the conduit. Although not required, symmetrically disposing the pair of slots about the vertical plane can help provide similar flow rates of molten material flowing from each corresponding side of the conduit.

The peripheral wall 205, 1205 of the conduit 203, 1203 may, for example, comprise a platinum wall comprising a platinum or platinum alloy although other materials may be provided that are compatible with the molten material and provide structural integrity at elevated temperatures. In further embodiments, the entire peripheral wall 205, 1205 may comprise or consist essentially of platinum or a platinum alloy. As such, in some embodiments, the conduit can comprise a platinum conduit 203, 1203 comprising the peripheral wall 205, 1205 defining the region 1101, 1202. Furthermore, the platinum conduit 203, 1203, if provided, can include the slot(s) 301, 403, 503 as described above, that can extend through the peripheral wall 205, 1205. As mentioned above, the slot(s) 301, 403, 503 can comprise a through slot in fluid communication with the region 1101, 1202 and the outer peripheral surface 1105, 1206 of the peripheral wall 205, 1205.

To reduce material costs of the conduit (e.g., platinum conduit 203, 1203), a thickness "h" of the peripheral wall 205, 1205 of the conduit can, for example, be from about 3 millimeters (mm) to about 7 mm although other thicknesses may be used in further embodiments. Providing the conduit with the thickness "h" within the range of from about 3 mm to about 7 mm can provide a thickness that is large enough to provide a desired level of structural integrity for the conduit while also providing a thickness that can be minimized to reduce the costs of the materials to produce the conduit (e.g., platinum conduit).

The peripheral wall 205, 1205 of the conduit 203, 1203 can comprise a wide range of sizes, shapes and configurations to reduce manufacturing and/or assembly costs and/or increase the functionality of the conduit 203, 1203. For instance, as shown, the outer peripheral surface 1105, 1206 and/or the inner surface 1106, 1207 of the peripheral wall 205, 1205 may comprise a circular shape along a cross-section taken perpendicular to the flow direction 1103 although other curvilinear shapes (e.g., oval) or polygonal shapes may be provided in further embodiments. Providing a curvilinear shape, such as a circular shape of both the outer peripheral surface and the inner peripheral surface can provide a peripheral wall with a constant thickness and can provide a wall with high structural strength and help promote consistent flow of molten material through the region 1101 of the conduit 203, 1203.

The cross-sectional area of the region taken perpendicular to the flow direction of any of the embodiments of the disclosure can remain the same along the flow direction. For instance, as shown in FIG. 11, the cross-sectional area of the region 1101 taken perpendicular to the flow direction 1103 can remain the same in the flow direction 1103. Indeed, as shown in FIG. 11, the cross-sectional area A1 of the region 1101 at an upstream location can be substantially equal to a cross-sectional area A2 of the region 1101 at a downstream location. Furthermore, as will be appreciated from FIGS. 9-11, the outer peripheral surface 1105 and/or the inner surface 1106 of the conduit 203 can include an identical circular shape (or other shape) along the length 1104. In such embodiments, the volumetric flow rate through the slot(s)

301, 403, 503 at various locations along the slot(s) can be controlled (e.g., maintained substantially the same) by modifying the width of the slot(s) 301, 403, 503 in the flow direction 1103 and/or opposite the flow direction 1103 as discussed above.

The cross-sectional area of the region taken perpendicular to the flow direction of any of the embodiments of the disclosure can alternatively vary along the flow direction. For instance, as shown in FIG. 12, the cross-sectional area of the region 1202 taken perpendicular to the flow direction 1103 of the conduit 1203 can decrease in the flow direction 1103 of the conduit 1203. Indeed, as shown in FIG. 12, the cross-sectional area A1 of the region 1202 at an upstream location can be greater than a cross-sectional area A2 of the region 1101 at a downstream location. In some embodiments, as shown, the cross-sectional area can continuously decrease from A1 to A2 (e.g., at a constant rate) along the flow direction 1103 although the cross-sectional area may decrease at a varying rate or provide step decreases in cross-sectional area. Providing a continuous decrease in cross-sectional area at a constant rate along the flow direction 1103 can provide a more consistent flow rate of molten material through the slot(s) 301, 403, 503 along the length of the slot. Furthermore, as will be appreciated from FIG. 12, the outer peripheral surface 1206 and/or the inner surface 1207 of the conduit 1203 can include a geometrically similar circular cross-sectional shape (or other shape) along the length 1104. In such embodiments, the volumetric flow rate through the slot(s) 301, 403, 503 at various locations along the slot(s) can be controlled (e.g., maintained substantially the same) by the decreasing cross-sectional area of the region 1202 along the flow direction 1103 either alone or in combination with increasing the width of the slot(s) 301, 403, 503 in the flow direction 1103 and/or opposite the flow direction as discussed above.

Figure 14:
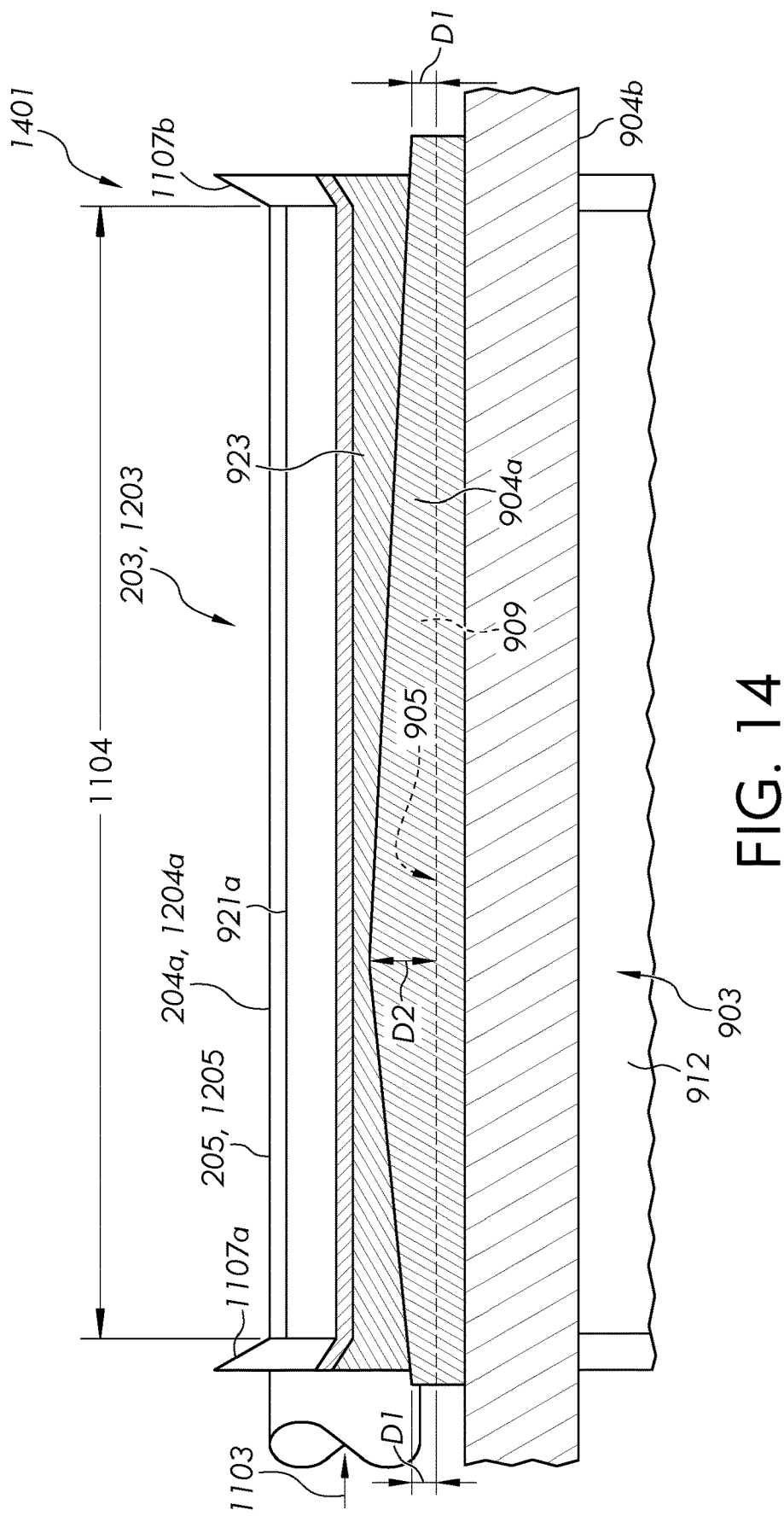
FIG. 14 shows a cross-sectional view of still further embodiments of the forming vessels along line 13-13 of FIG. 9.
Figure 15:
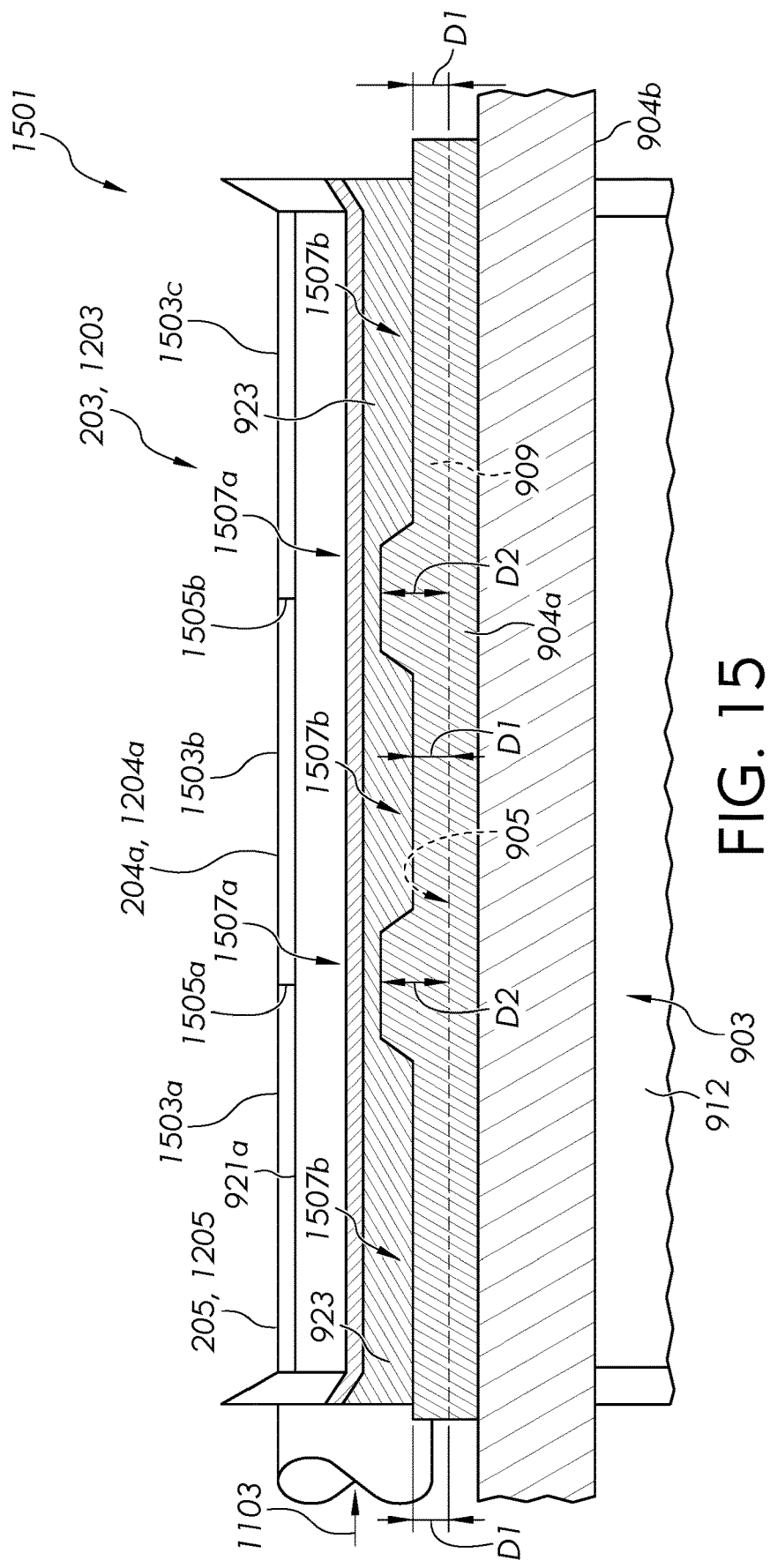
FIG. 15 shows a cross-sectional view of additional embodiments of the forming vessels along line 13-13 of FIG. 9.

The conduits 203, 1203 (e.g., platinum conduits) of any of the embodiments of the disclosure can comprise a continuous conduit although segmented conduits may be provided in further embodiments. For instance, as illustrated in FIGS. 11-14, the conduit 203, 1203 can comprise a continuous conduit that is not segmented along the length of the conduit. Such a continuous conduit may be beneficial to provide a seamless conduit with increased structural strength. In some embodiments, a segmented conduit may be provided. For instance, as shown in FIG. 15, the conduit 203, 1203 (e.g., platinum conduit) of the forming vessel 1501 can optionally comprise conduit segments 1503a, 1503b, 1503c that can be connected together in series at joints 1505a, 1505b between abutting ends of pairs of adjacent conduit segments. In some embodiments, the joints may comprise welded joints to integrally join the conduit segments 1503a, 1503b, 1503c as an integral conduit extending along the length of the slot 301. Providing the conduit as a series of conduit segments 1503a, 1503b, 1503c may simplify fabrication of conduits in some applications.

Embodiments of the forming vessel 140, 401, 501, 1001, 1201, 1401, 1501 can optionally include a support member 903, 1003 (see FIGS. 9 and 10) positioned to support a weight of the conduit 203, 1203 and the molten material within the region 1101, 1202. As shown in FIG. 10, the support member 1003 can include an upper surface 1005 designed to support the weight of the conduit 203, 1203 and associated molten material. The upper support surface 1005 is shown as a flat surface although other surfaces, such as a concave surface may be provided in further embodiments. If provided as a concave surface, the concave surface may be geometrically similar to a convex surface segment of the outer peripheral surface 1105, 1206 of the conduit 203, 1203 to provide a cradle to help position the conduit relative to the support surface 1005 and distribute the weight of the conduit more evenly along the support surface 1005.

In further embodiments, in addition to supporting the weight of the conduit 203, 1203 and the molten material associated with the conduit, the support member may be configured to help maintain the shape and/or dimensions of the conduit 203, 1203 such as the shape and dimensions of the slot(s) 301, 403, 503. For example, embodiments of the forming vessel 140, 401, 501, 1201, 1401, 1501 can include a support member 903 (e.g., see FIGS. 9, 11 and 12) comprising a support surface 905 defining an area 909 receiving a second portion 204b, 1204b of the peripheral wall 205, 1205. As shown in FIGS. 9, 11 and 12, the first portion 204a, 1204a of the peripheral wall 205, 1205 can be opposite the second portion 204b, 1204b of the peripheral wall 205, 1205. Consequently, the lowest portions of the conduit 203, 1203 associated with the second portion 204b, 1204b of the peripheral wall 205, 1205 can be received and seated within the area 909 defined by the support surface 905 of the support member 903. In some embodiments, as shown in FIG. 9, the support surface 905 of the support member 903 can surround from about 25% to about 60% of the outer peripheral surface 1105, 1206 of the peripheral wall 205, 1205 of the conduit 203, 1203. Providing the support surface surrounding from about 25% to about 60% of the outer peripheral surface 1105, 1206 can help prevent lateral deformation of opposite portions of the peripheral wall 205, 1205 of the conduit 203, 1203 that may otherwise undesirably increase a width of the slot(s) 301, 403, 503. Furthermore, in some embodiments, the plurality of slots 503 spaced apart by a portion 617 of the conduit described with respect to FIGS. 5 and 6 above can further increase the strength of the conduit to further help prevent lateral deformation of opposite portions of the peripheral wall 205, 1205 of the conduit 203, 1203 and further help maintain the width of the slots 503. Thus, surrounding of at least a portion of the outer peripheral surface 1105, 1206 can help prevent deformation to maintain the dimensions of the width of the slot(s) 301, 403, 503 along the length 1104 of the slot, thereby providing consistent flow characteristics of molten material through the slot 301 in use. Furthermore, providing any slot of the disclosure as a plurality of slots (e.g., the plurality of slots 503 with strengthening portions 617) can still further help prevent deformation and maintain the dimensions of the width of the slot(s) 301, 403, 503. Still further, the cross-sectional shape of the conduit 203, 1203 may also be maintained at a desired predetermined shape to help maintain desired attributes of molten material traveling along the flow direction 1103.

As shown in FIGS. 9, 11-13 a depth "D" of the area 909 receiving the second portion 204b, 1204b of the peripheral wall 205, 1205 can remain substantially the same along the length 1104 of the slot(s) 301, 403, 503. Alternatively, as shown in FIGS. 14-15, a depth of the area 909 receiving the second portion 204b, 1204b of the peripheral wall 205, 1205 can vary along the length 1104 of the slot(s) 301, 403, 503. Such embodiments can minimize the amount of material used to form the support member at areas that require less lateral support while further providing increased depth for additional lateral support at locations where further lateral support may be desired. For example, as shown in FIG. 14, the depth of the area 909 receiving the second portion 204b, 1204b of the peripheral wall can be greatest at depth "D2" at a location of less than about 33% of the length 1104 of the slot 301 measured in the flow direction 1103 of the conduit 203, 1203. In some embodiments, the depth of the peripheral wall can be greatest at a location of less than or equal to about 33% of the axial length of the conduit 203, 1203 in the flow direction 1103 from a symmetrical centerline of an upper end of the inlet conduit 141 (see FIG. 1). Providing the increased depth "D2" at the location less than or equal to about 33% of the axial length of the conduit 203, 1203, such as less than about 33% of the length 1104 of the slot(s) 301, 403, 503, as discussed above, can maximize lateral support of the conduit 203, 1203 at the location where stress is maximized while reducing the depth (e.g., at depth "D1") at other locations that require less lateral support to maintain the dimensions of the conduit 203, 1203 such as the width of the slot(s) 301, 403, 503.

As mentioned previously, as shown in FIG. 15, the conduit 203, 1203 (e.g., platinum conduit) of the forming vessel 1501 can optionally comprise conduit segments 1503a, 1503b, 1503c that can be connected together in series at joints 1505a, 1505b between abutting ends of pairs of adjacent conduit segments. In such embodiments, as shown in FIG. 15, the depth "D2" of the area 909 receiving the second portion 204b, 1204b of the peripheral wall 205, 1205 can be greater at a lateral location 1507a of the joint 1505a, 1505b than at other locations 1507b of the conduit segments 1503a, 1503b, 1503c. Providing the increased depth "D2" at the lateral locations 1507a of the joints 1505a, 1505b, as discussed above, can maximize lateral support of the conduit 203, 1203 at the location where stress concentrations occur due to any discontinuities at the joint while reducing the depth at the intermediate locations 1507b that require less lateral support in some embodiments.

Figure 2:
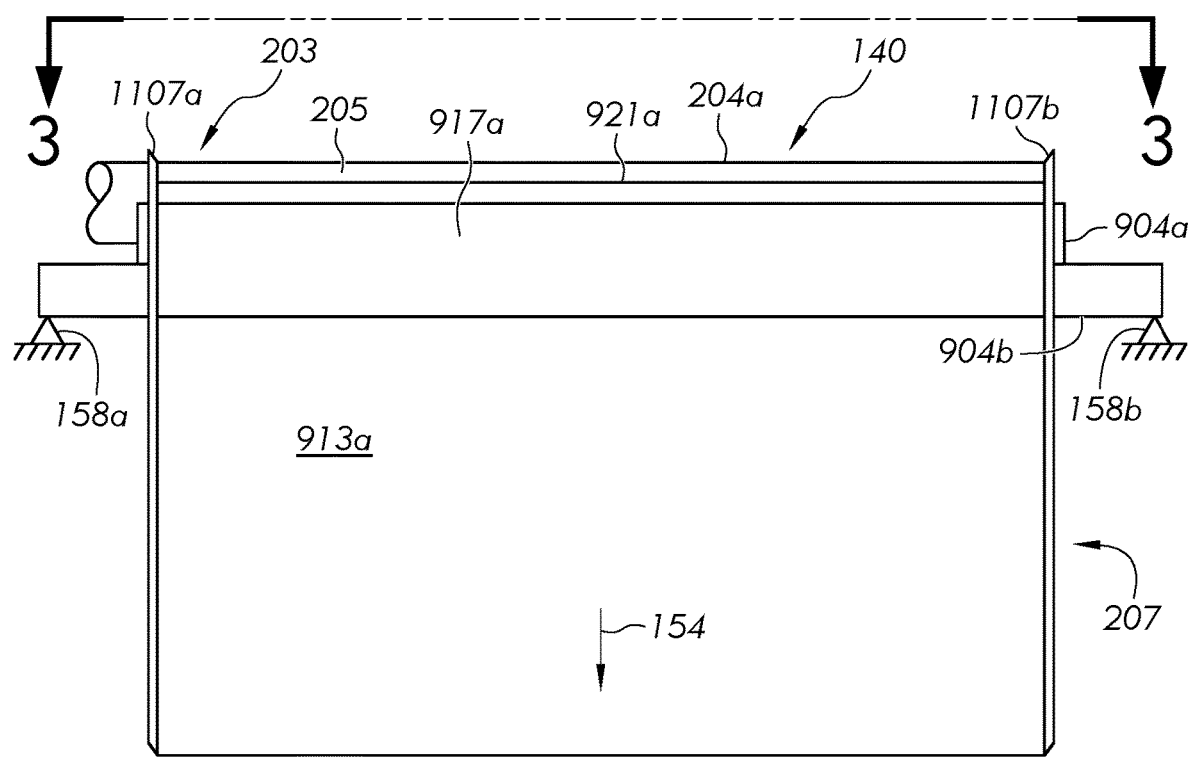
FIG. 2 shows an elevational view of a forming vessel in accordance with an embodiment of the disclosure.

Support members 903, 1003 of the disclosure can, for example, be provided as a single monolithic support member (e.g., a single monolithic support beam). In some alternative embodiments, as schematically shown in FIGS. 9-15, the support members 903, 1003 can optionally include a first support beam 904a, 1004a and a second support beam 904b, 1004b that supports the first support beam. As shown, the first support beam 904a, 1004a and second support beam 904b, 1004b can comprise a stack of support beams where the first support beam 904a, 1004a is stacked on top of the second support beam 904b, 1004b. Providing a stack of support beams can simplify and/or reduce the cost of fabrication. For instance, in some embodiments, the second support beam 904b, 1004b can be longer than the first support beam 904a, 1004a such that opposite end portions of the second support beam 904b, 1004b can extend laterally outside of the width of the root 915 to be supported (e.g., simply supported) at opposite locations 158a, 158b as shown in FIGS. 1 and 2. As such, the second support beam 904b, 1004b can be longer than the width "W" of the formed glass ribbon 103 and can extend through a hollow area 912 laterally extending through the forming vessel 140, 401, 501, 1001, 1201, 1401, 1501 to fully support the forming vessel along the length of the forming vessel. Furthermore, the second support beam 904b, 1004b may comprise a shape such as the illustrated rectangular shape although a hollow shape, a shape of an I-beam or other shape may be provided to reduce material costs while still providing a relatively high bending moment of inertial for the support beam. Furthermore, the first support beam 904a, 1004a can be fabricated with a shape to support the conduit to help maintain the shape and dimensions of the conduit as discussed above.

In some embodiments, the first support beam 904a, 1004a and the second support beam 904b, 1004b may be fabricated from substantially the same or identical material although alternative materials may be provided in further embodiments. In some embodiments, the support members 903, 1003 can be fabricated from a support material with a creep rate from $1 \times 10^{-12}$ 1/s to $1 \times 10^{-14}$ 1/s under a pressure of from 1 MPa to 5 MPa at a temperature of 1400° C. In some embodiments, the support member positioned to support a weight of the conduit can be fabricated from ceramic material (e.g., silicon carbide) that, in some embodiments, can comprise a creep rate from $1 \times 10^{-12}$ 1/s to $1 \times 10^{-14}$ 1/s under a pressure of from 1 MPa to 5 MPa at a temperature of 1400° C. Such a support material can provide sufficient support for the conduit and molten material carried by the conduit at high temperatures (e.g., 1400° C.) with minimal creep to provide a forming vessel 140, 401, 501, 1001, 1201, 1401, 1501 that minimizes use of platinum or other expensive refractory materials ideal for physically contacting the molten material without contaminating the molten material while providing a support member 903, 1003 fabricated from a relatively less expensive material that can withstand large stresses under the weight of the forming vessel and molten material carried by the forming vessel. At the same time, the support member 903, 1003 fabricated from the material discussed above can withstand creep under high stress and temperature to allow maintenance of the position and shape of the conduit and walls (e.g., platinum walls) associated with the conduit.

Any of the forming vessels 140, 401, 501, 1001, 1201, 1401, 1501 of the embodiments of the disclosure can comprise a forming wedge. The forming wedge 207 and associated structures (e.g., the sidewalls 911a, 911b) will be described with reference to the embodiments shown in FIGS. 2, 9 and 10 with the understanding that a similar or identical forming wedge 207 may be incorporated with features of any of the embodiments of the disclosure. For example, as shown in FIGS. 2 and 9, the forming vessel includes a forming wedge 207 positioned downstream from the slot(s) 301, 403, 503 of the conduit 203, 1203 in a draw direction 154. As shown in FIG. 9, the forming wedge 207 can include a first sidewall 911a defining a first wedge surface 913a and a second sidewall 911b defining a second wedge surface 913b. As shown in FIG. 9, the first wedge surface 913a and the second wedge surface 913b can converge in the downstream draw direction 154 to form a root 915 of the forming wedge 207.

In some embodiments, the sidewalls 911a, 911b can comprise a platinum and/or a platinum alloy similar or identical to the composition of the conduits although different compositions may be employed in further embodiments. As such, in some embodiments, the first sidewall 911a and the second sidewall 911b can each comprise a platinum sidewall. To reduce material costs, the thickness of the sidewalls 911a, 911b (e.g., platinum sidewalls) can, for example, be within a range from about 3 mm to about 7 mm. A reduced thickness can result in overall reduced material costs. At the same time, the configuration of the sidewalls and/or the placement of the support member can provide the sidewalls with sufficient structural integrity to resist deformation in use despite the relatively low thickness. For instance, as shown in FIGS. 9 and 10, the support member 903, 1003 can be positioned between an upstream portion 917a of the first sidewall 911a and an upstream portion 917b of the second sidewall 911b. As such, the spacing between the upstream portions 917a, 917b can be maintained by the support member 903, 1003 positioned therebetween. Furthermore, a hollow area 912 can optionally be provided that can further reduce material costs and allow the support member to extend through the hollow area to support the conduit at locations 158a, 158b. Furthermore, the first sidewall 911a and the second sidewall 911b converge in the downstream draw direction 154 to form the root 915 wherein a strong triangular construction can be formed by the sidewalls and the base of the support members 903, 1003. As such, a structurally rigid configuration can be achieved with relatively thin sidewalls within the range from about 3 mm to about 7 mm.

As shown in FIGS. 9 and 10, in some embodiments, an upstream end 919a of the upstream portion 917a of the first sidewall 911a (e.g., platinum sidewall) can be attached to the peripheral wall 205 of the conduit 203 (e.g., platinum conduit) at a first interface 921a. Likewise, an upstream end 919b of the upstream portion 917b of the second sidewall 911b (e.g., platinum sidewall) can be attached to the peripheral wall 205 of the conduit 203 (e.g., platinum conduit) at the second interface 921b. As shown, the first interface 921a and the second interface 921b can be each located downstream from the slot(s) 301, 403, 503 of the conduit 203. In some embodiments, the upstream ends 919a, 919b of the sidewalls 911a, 911b can be welded to the peripheral wall 205 of the conduit 203 and machined to have a smooth corresponding interface 921a, 921b between the outer surface of the upper portion of the conduit and the outer surface of the sidewalls.

In some embodiments, the upstream portions of the first and second sidewall can be parallel with one another as shown in FIG. 10. Alternatively, as shown in FIG. 9, the upstream portion 917a of the first sidewall 911a and the upstream portion 917b of the second sidewall 911b initially flare away from one another in the downstream direction 154 from the corresponding interface 921a, 921b. Flaring the sidewalls away from one another can facilitate downward flow of molten material along the downstream direction 154 while also allowing increased space for the support member 903 in some embodiments. For instance, as shown in FIG. 9, the support surface 905 of the support member 903 can be defined by a base wall 908 and to opposed inwardly facing channel wall surfaces of opposite channel walls 906a, 906b extending upwardly from the base wall 908. The inwardly facing channel wall surfaces of the opposite channel walls 906a, 906b and the inwardly facing bottom surface of the base wall 908 can form a cradle defining the area 909 that can comprise the illustrated channel area to receive the second portion 204b of the peripheral wall 205.

In some embodiments, the material of the wall may be incompatible for physical contact with the material of the support member 903, 1003. For example, in some embodiments, the wall can comprise platinum (e.g. platinum or platinum alloy) and the support member 903, 1003 can comprise silicon carbide that may corrode or otherwise chemically react with the platinum of the wall contacts the support member. As such, in some embodiments, to avoid contact between incompatible materials, any portion of the wall (e.g., first sidewall 911a, second sidewall 911b) and any portion of the conduit 203, 1203 may be prevented from physically contacting any portion of the support member 903, 1003. As shown, for example, in FIGS. 9 and 10, the first sidewall 911a and the second sidewall 911b are each spaced from physically contacting any portion of the support member 903, 1003. Furthermore, the conduit 203, 1203 can be spaced from physically contacting any portion of the support member 903, 1003. Various techniques can be used to space the wall from the support member. For example, pillars or ribs may be provided to provide spacing.

In further embodiments, as shown, a layer of intermediate material 923 may be provided between the sidewalls 911a, 911b and the support member 903, 1003 to space the sidewalls 911a, 911b and the conduit 203, 1203 from contacting the support member 903, 1003. In some embodiments, the layer of intermediate material 923 may be continuously provided between all portions of the sidewalls 911a, 911b and adjacent spaced portions of the support member 903, 1003. Providing a continuous layer of intermediate material 923 can facilitate even support across all portions of the sidewalls by the surface of the support member 903, 1003 spaced from the sidewalls.

As shown, in some embodiments, the second portion 204b, 1204b of the peripheral wall 205, 1205 of the conduit 203, 1203 can be positioned within the area 909 of support member 903, 1003 and supported by the support member 903, 1003, wherein conduit 203, 1203 (e.g., all portions of the conduit) can be spaced from physically contacting any portion of the support member 903, 1003. For instance, as shown, the layer of intermediate material 923 may be provided as a continuous layer of intermediate material to space all portions of the conduit 203, 1203 from physically contacting any portion of the support member 903, 1003. As such, the layer of intermediate material 923 can provide continuous support of the portions of the conduit 203, 1203 to increase strength and resistance to deformation and creep of the conduit 203, 1203.

Various materials can be used as the intermediate material 923 depending on the materials of the wall and the support member. For instance, the material can comprise alumina or other material that is compatible for contacting platinum and silicon carbide under high temperature and pressure conditions associated with containing and guiding molten material with the forming vessels 140, 401, 501, 1001, 1201, 1401, 1501. Thus, in some embodiments, platinum or platinum alloy sidewalls and platinum conduit can be spaced from physically contacting any portion of a support member 903, 1003 comprising silicon carbide by way of a layer of intermediate material comprising alumina.

Methods of fabricating the glass ribbon 103 from the quantity of molten material 121 with any of the forming vessels 140, 401, 1001, 1201, 1401, 1501 discussed above can include flowing the molten material 121 within the region 1101 in the flow direction 1103 of the conduit 203, 1203. Referring to FIGS. 9 and 10, the method can further include flowing the molten material 121 through the slot(s) 301, 403 from the region 1101 of the conduit 203, 1203 as a first stream 925a of molten material and a second stream 925b of molten material. The method can still further include flowing the first stream 925a of molten material on the first wedge surface 913a along the downstream direction 154 and the second stream 925b of molten material on the second wedge surface 913b along the downstream direction 154. The method can then include drawing the first stream 925a of molten material and the second stream 925b of molten material from the root 915 of the forming wedge 207 as the glass ribbon 103.

The slot of any of the embodiments of the forming vessel 140, 1001, 1201, 1401, 1501 discussed above can be provided as a plurality of slots (e.g., the plurality of slots 503 discussed above). In such embodiments, the methods of producing the glass ribbon with any of the forming vessels 140, 1001, 1201, 1401, 1501 may comprise flowing the molten material 121 within the region 1101 in the flow direction 1103 of the conduit 203, 1203. Referring to FIGS. 5 and 6, the method can further include flowing the molten material 121 through each slot of the plurality of slots 503 from the region 1101 of the conduit 203, 1203. The method can further include merging the molten material 121 flowing through each slot of the plurality of slots 503 into a first stream 925a of molten material and a second stream 925b of molten material. Indeed, in some embodiments the enlarged ends of the slots may provide increased volumetric flow at the ends to help fill the gap produced by the portion 917 of the conduit extending between pairs of slots of the plurality of slots 503. With reference to FIG. 9, the method can still further include flowing the first stream 925a of molten material on the first wedge surface 913a along the downstream direction 154 and the second stream 925b of molten material on the second wedge surface 913b along the downstream direction 154. The method can then include drawing the first stream 925a of molten material and the second stream 925b of molten material from the root 915 of the forming wedge 207 as a fused sheet of molten material that can then be cooled into the glass ribbon 103.

Example embodiments of producing glass ribbon 103 with the forming vessel 401 of FIG. 4 can include flowing molten material 121 within a region 1101 defined by a peripheral wall 205 of a conduit 203. The conduit can comprise the slot 403 extending through the outer surface of the peripheral wall 205 and comprising the first outer end portion 405a, the second outer end portion 405b, and the intermediate portion 404 positioned between the first outer end portion 405a and the second outer end portion 405b. As shown in FIGS. 4 and 7, the first outer end portion 405a and the second outer end portion 405b of the slot 403 can each be tapered in opposite directions 407a, 407b. The method can include flowing molten material 121 through the slot 403 in the peripheral wall wherein, as shown by the normalized volumetric flow profile 803 in FIG. 8, the volumetric flow profile of molten material 121 through the slot 403 comprises a volumetric molten material flow rate at a location of the intermediate portion 404 that is greater than a volumetric molten material flow rate at a location of the first end portion 405a and at a location of the second end portion 405b. As shown in FIG. 9, the method can still further include flowing the first stream 925a of molten material from the slot 403 over the first wedge surface 913a along the downstream direction 154 and flowing the second stream 925b of molten material from the slot 403 over the second wedge surface 913b along the downstream direction 154. As such, the first stream 925a of molten material and the second stream 925b of molten material converge in the downstream direction 154 toward the root 915. The method can then include drawing the first stream 925a of molten material and the second stream 925b of molten material from the root 915 of the forming wedge 207 as a fused sheet of molten material that is thereafter cooled into the glass ribbon 103.

In each of the embodiments of the disclosure a glass ribbon 103 may be fusion drawn off the root 915 in a draw plane in the draw direction 154. In some embodiments, the glass separator 149 (see FIG. 1) can then subsequently separate a glass sheet 104 from the glass ribbon 103 along the separation path 151. As illustrated, in some embodiments, the separation path 151 can extend along the width "W" of the glass ribbon 103 between the first outer edge 153 and the second outer edge 155. Additionally, in some embodiments, the separation path 151 can extend perpendicular to the draw direction 154 of the glass ribbon 103. Moreover, in some embodiments, the draw direction 154 can define a direction along which the glass ribbon 103 can be fusion drawn from the forming vessel. In some embodiments, the glass ribbon 103 can include a speed as it traverses along draw direction 154 of >50 mm/s, >100 mm/s, or >500 mm/s, for example, from about 50 mm/s to about 500 mm/s, such as from about 100 mm/s to about 500 mm/s, and all ranges and subranges therebetween.

Throughout the embodiments of the disclosure, the width "W" of the glass ribbon 103 can, for example, be greater than or equal to about 20 mm, such as greater than or equal to about 50 mm, such as greater than or equal to about 100 mm, such as greater than or equal to about 500 mm, such as greater than or equal to about 1000 mm, such as greater than or equal to about 2000 mm, such as greater than or equal to about 3000 mm, such as greater than or equal to about 4000 mm, although other widths less than or greater than the widths mentioned above can be provided in further embodiments. For example, in some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Furthermore, as shown in FIG. 1, before or after dividing the glass sheet 104 from the glass ribbon 103 along the separation path 151, the glass ribbon 103 or the glass sheet 104 may be divided along one or more vertical separation paths 507a, 507b, 507c, 507d with corresponding glass separators 157 into a plurality of divided glass ribbons or a plurality of divided glass sheets. In some embodiments, once separated with the glass separators 157 along the separation paths 507a, 507b, 507c, 507d, the outer portions may be discarded to remove bulbous edges of the ribbon, thereby leaving the pristine central portion 152 to be divided into one or more central pristine glass ribbon(s)/glass sheet(s). As shown in FIG. 5, in some embodiments, the separation paths 507a, 507b, 507c, 507d can each be aligned with a location laterally between a pair of adjacent end portions 605a, 605b of a corresponding pair of adjacent slots of the plurality of slots 503. In that manner, the separation paths can be aligned with any discontinuity in the glass ribbon arising from the portion 917 of the conduit extending between pairs of slots of the plurality of slots 503. In some embodiments, such discontinuity at the separation path can be located at the edge of the glass ribbon/glass sheet separated along the separation path. As such, any discontinuity due to the aligned location of the separation path can be located at the edge(s) of the separated glass ribbons/glass sheets. In some embodiments, undesirable attributes of the glass due to a discontinuity due to the portion 917 associated with the separation path may not interfere with the functionality of the glass ribbons/glass sheets since the discontinuity can be limited to the edges of the glass ribbons/glass sheets that may not be used to transmit light in use.

As shown in FIG. 9, the glass ribbon 103 can be drawn from the root 915 with a first major surface of the glass ribbon 103 and a second major surface of the glass ribbon 103 facing opposite directions and defining a thickness "T" (e.g., average thickness) of the glass ribbon 103. In some embodiments throughout the present disclosure, forming vessels of the disclosure can provide that the thickness "T" of the glass ribbon 103 can be less than or equal to about 2 millimeters (mm), less than or equal to about 1 millimeter, less than or equal to about 0.5 millimeters, for example, less than or equal to about 300 micrometers (μm), less than or equal to about 200 micrometers, or less than or equal to about 100 micrometers, although other thicknesses may be provided in further embodiments. For example, in some embodiments, the thickness "T" of the glass ribbon 103 can be from about 50 μm to about 750 μm, from about 100 μm to about 700 μm, from about 200 μm to about 600 μm, from about 300 μm to about 500 μm, from about 50 μm to about 500 μm, from about 50 μm to about 700 μm, from about 50 μm to about 600 μm, from about 50 μm to about 500 μm, from about 50 μm to about 400 μm, from about 50 μm to about 300 μm, from about 50 μm to about 200 μm, from about 50 μm to about 100 μm, including all ranges and subranges of thicknesses therebetween. In addition, the glass ribbon 103 can include a variety of compositions including, but not limited to, soda-lime glass, borosilicate glass, alumino-borosilicate glass, alkali-containing glass, or alkali-free glass.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Likewise, a "plurality" is intended to denote "more than one."

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the appended claims. Thus, it is intended that the present disclosure cover the modifications and variations of the embodiments herein provided they come within the scope of the appended claims and their equivalents.

What is claimed is:

1. An apparatus comprising:
    a conduit comprising a peripheral wall defining a region extending in a flow direction of the conduit, a first portion of the peripheral wall comprising a plurality of slots extending through the peripheral wall, wherein each slot of the plurality of slots is in fluid communication with the region, and at least one slot of the plurality of slots comprises an intermediate length extending between a first end portion of the at least one slot and a second end portion of the at least one slot, wherein a maximum width along the intermediate length is less than a maximum width of the first end portion and a maximum width of the second end portion; and
    a wedge positioned downstream from the plurality of slots, the wedge comprising a first wedge surface and a second wedge surface converging to form a root.

2. The apparatus of claim 1, wherein the slots are aligned along a linear path.

3. The apparatus of claim 2, wherein the linear path is parallel to the flow direction of the conduit.

4. The apparatus of claim 3, wherein the linear path, the flow direction and the root of the wedge extend along a common plane.

5. The apparatus of claim 1, wherein a width of the intermediate length of the at least one slot continuously decreases in the flow direction of the conduit.

6. The apparatus of claim 1, wherein a width of the intermediate length of the at least one slot continuously decreases opposite the flow direction of the conduit.

7. The apparatus of claim 1, wherein a length of the first end portion of the at least one slot and a length of the second end portion of the at least one slot is less than the intermediate length of the at least one slot.

8. The apparatus of claim 7, wherein the length of the first end portion comprises 33% of an overall length of the at least one slot, the length of the second end portion comprises 33% of the overall length of the at least one slot, and the intermediate length comprises 34% of the overall length of the at least one slot.

9. The apparatus of claim 1, wherein the maximum width of the first end portion of the at least one slot is substantially equal to the maximum width of the second end portion of the at least one slot.

10. The apparatus of claim 1, wherein the first end portion of the at least one slot and the second end portion of the at least one slot each comprises a bulbous portion.

11. The apparatus of claim 1, wherein a length of the first end portion of the at least one slot is equal to a length of the second end portion of the at least one slot.

12. The apparatus of claim 1, wherein a length of the first end portion of the at least one slot is less than a length of the second end portion of the at least one slot.

13. The apparatus of claim 1, wherein a width of the intermediate length of the at least one slot remains substantially equal in the flow direction of the conduit.

14. The apparatus of claim 1, wherein the first portion of the peripheral wall comprises the plurality of slots at an uppermost apex of the conduit.

15. The apparatus of claim 1, wherein the plurality of slots comprises more than three slots.

16. A method of producing a glass ribbon, the method comprising:
providing an apparatus comprising:
a conduit comprising a peripheral wall defining a region extending in a flow direction of the conduit, a first portion of the peripheral wall comprising a plurality of slots extending through the peripheral wall, wherein each slot of the plurality of slots is in fluid communication with the region, and at least one slot of the plurality of slots comprises an intermediate length extending between a first end portion of the at least one slot and a second end portion of the at least one slot, wherein a maximum width along the intermediate length is less than a maximum width of the first end portion and a maximum width of the second end portion; and
a wedge positioned downstream from the plurality of slots, the wedge comprising
a first wedge surface and a second wedge surface converging to form a root;
flowing a molten material within the region extending in the flow direction of the conduit;
flowing the molten material through each slot of the plurality of slots;
merging the molten material flowing through each slot of the plurality of slots into a first stream of molten material flowing over the first wedge surface and a second stream of molten material flowing over the second wedge surface;
drawing the first stream of molten material and the second stream of molten material off the root into a fused sheet of molten material; and
cooling the fused sheet of molten material into the glass ribbon.

17. The method of claim 16, further comprising separating the glass ribbon into a plurality of divided glass ribbons along a separation path aligned with a location laterally between a pair of adjacent end portions of a corresponding pair of adjacent slots of the plurality of slots.

18. An apparatus comprising:
a conduit comprising a peripheral wall defining a region extending in a flow direction of the conduit, a first portion of the peripheral wall comprising a plurality of spaced apart slots extending through the peripheral wall and aligned along a linear path at an uppermost apex of the conduit, each slot of the plurality of slots is in fluid communication with the region and comprises an intermediate length extending between a first end portion and a second end portion, wherein a maximum width along the intermediate length is less than a maximum width of the first end portion and a maximum width of the second end portion; and
a wedge positioned downstream from the plurality of slots, the wedge comprising a first wedge surface and a second wedge surface converging to form a root.

19. A method of producing a glass ribbon, the method comprising:
providing an apparatus comprising:
a conduit comprising a peripheral wall defining a region extending in a flow direction of the conduit, a first portion of the peripheral wall comprising a plurality of spaced apart slots extending through the peripheral wall and aligned along a linear path at an uppermost apex of the conduit, each slot of the plurality of slots is in fluid communication with the region and comprises an intermediate length extending between a first end portion and a second end portion, wherein a maximum width along the intermediate length is less than a maximum width of the first end portion and a maximum width of the second end portion; and
a wedge positioned downstream from the plurality of slots, the wedge comprising
a first wedge surface and a second wedge surface converging to form a root;
flowing a molten material within the region extending in the flow direction of the conduit;
flowing the molten material through each slot of the plurality of slots;
merging the molten material flowing through each slot of the plurality of slots into a first stream of molten material flowing over the first wedge surface and a second stream of molten material flowing over the second wedge surface;
drawing the first stream of molten material and the second stream of molten material off the root into a fused sheet of molten material; and
cooling the fused sheet of molten material into the glass ribbon.

20. The method of claim 19, further comprising separating the glass ribbon into a plurality of divided glass ribbons along a separation path aligned with a location laterally between a pair of adjacent end portions of a corresponding pair of adjacent slots of the plurality of slots.

* * * * *